United States Patent
Shimada et al.

[11] Patent Number: 5,924,284
[45] Date of Patent: Jul. 20, 1999

[54] HYDRAULIC BOOSTING DEVICE

[75] Inventors: Masahiro Shimada; Satoru Watanabe, both of Higashimatsuyama, Japan

[73] Assignee: Jidosha Kiki Co., Ltd., Tokyo, Japan

[21] Appl. No.: 08/969,571

[22] Filed: Nov. 13, 1997

[30] Foreign Application Priority Data

Nov. 29, 1996 [JP] Japan .................................. 8-319182

[51] Int. Cl.⁶ .................................................. B60T 13/20
[52] U.S. Cl. ............................................. 60/550; 60/582
[58] Field of Search ................................. 60/547.1, 550, 60/555, 582

[56] References Cited

U.S. PATENT DOCUMENTS

| | | | |
|---|---|---|---|
| 3,978,667 | 9/1976 | Ohara ..................................... | 60/582 X |
| 4,072,011 | 2/1978 | Ewald ..................................... | 60/582 X |
| 4,702,530 | 10/1987 | Belart et al. ........................... | 60/582 X |
| 4,732,001 | 3/1988 | Belart et al. ........................... | 60/550 |
| 5,038,564 | 8/1991 | Horiuchi et al. ....................... | 60/550 X |
| 5,577,384 | 11/1996 | Watanabe et al. ..................... | 60/550 |

*Primary Examiner*—Hoang Nguyen
*Attorney, Agent, or Firm*—Kaensaka & Takeuchi

[57] ABSTRACT

In a hydraulic boosting device of the present invention, when the pressure stored in an emergency accumulator is less than a set pressure, a stepped piston 70 moves downward, a throttle valve 72 is set in a first position where the throttle valve 72 is seated in a valve seat 71, and hydraulic fluid flowing from a pump through an inlet path 14 is restricted by a flow limiting valve 68 so as to develop a fluid pressure in an annular path 73. The fluid pressure is stored in the emergency accumulator through a path 69, an accumulator valve 27, and an accumulator path 31. When the pressure stored in the emergency accumulator exceeds the set pressure, the stepped piston 70 moves upward, the throttle valve 72 is set in a second position where the throttle valve 72 is apart from the valve seat 71, and the hydraulic fluid from the pump is not restricted by the flow limiting valve 68 at all so as to flow freely toward a control valve. In this state, no fluid pressure is developed in the annular path 73.

8 Claims, 12 Drawing Sheets

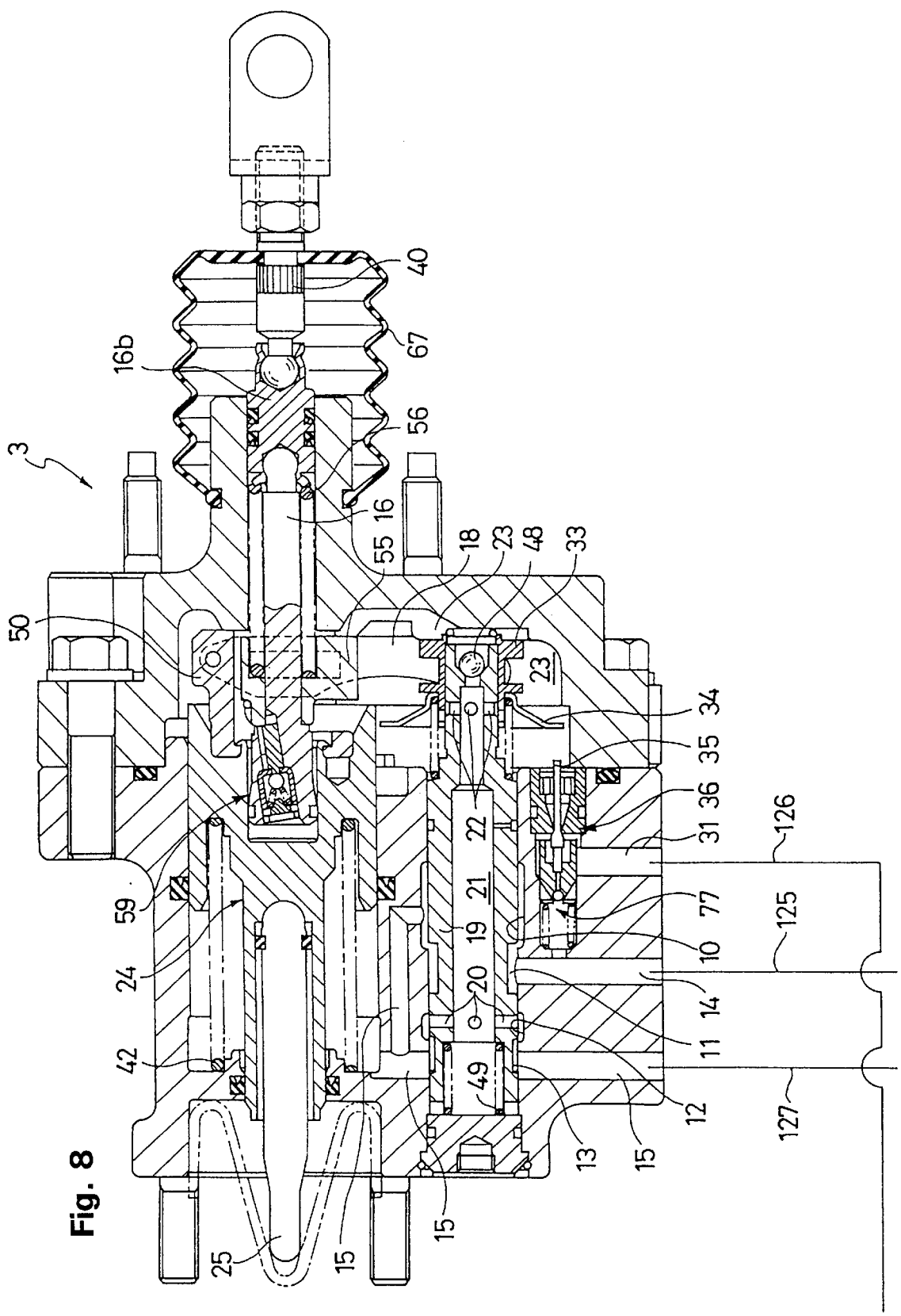

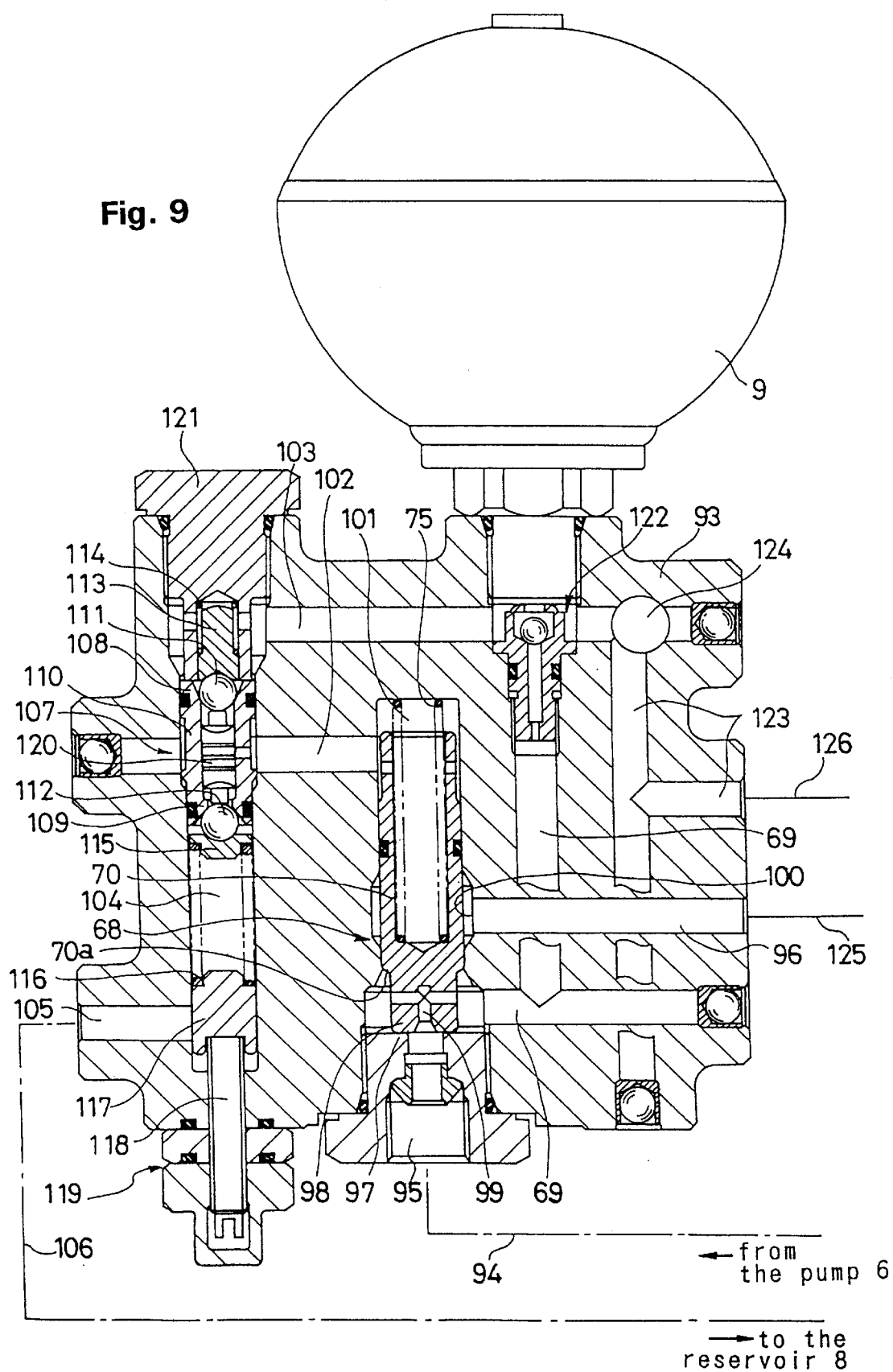

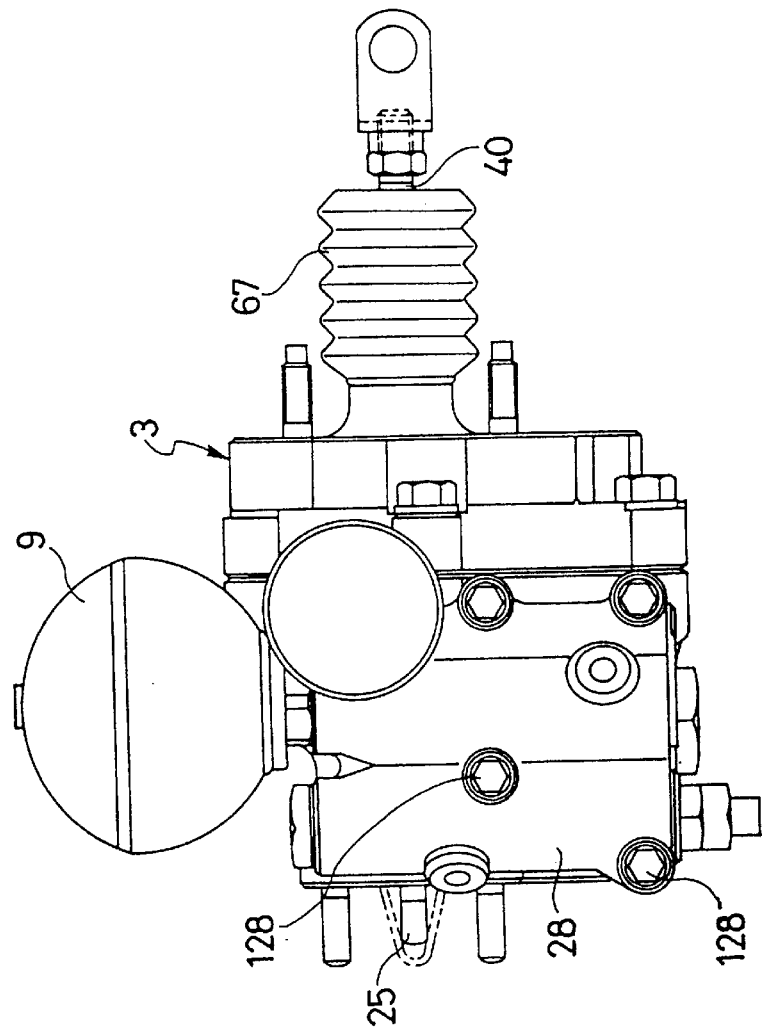
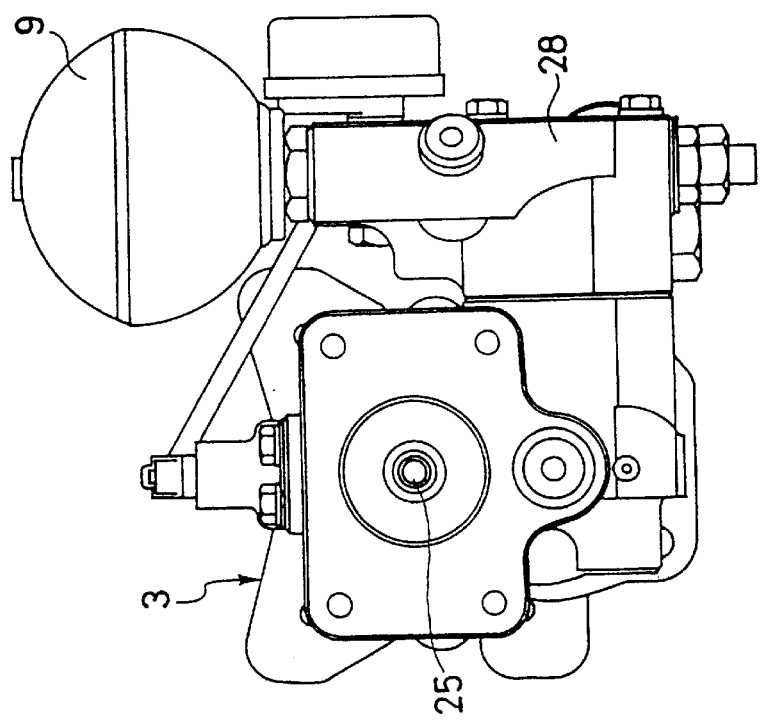

HYDRAULIC BOOSTING DEVICE

BACKGROUND OF THE INVENTION

The present invention relates to a hydraulic boosting device of open centre type such as a brake booster of open centre type which intensifies braking force by boosting leg-power exerted on a brake pedal in a vehicle by hydraulic fluid, and more particularly to a hydraulic boosting device provided with an emergency accumulator in which emergency fluid pressure is stored for actuating the hydraulic boosting device when fluid pressure of hydraulic fluid is dropped.

For example, a hydraulic boosting system which boosts operating force exerted on an operating member by using the fluid pressure of hydraulic fluid is sometimes used in a vehicle. As one of such hydraulic boosting systems, there is a hydraulic brake system in which a hydraulic boosting device which operates with fluid pressure of hydraulic fluid is employed. The hydraulic boosting device boosts leg-power exerted on a brake pedal to actuate a master cylinder with the boosted power in order to provide large braking forces which can not be obtained by the leg-power alone or to reduce leg-power to be exerted on the brake pedal.

One of such conventional hydraulic brake systems is a hydraulic brake system as shown in FIG. 11. In this figure, reference numeral 1 designates the hydraulic brake system, 2 designates a brake pedal, 3 designates an open centre type hydraulic brake booster (hereinafter, sometimes referred to as "brake booster" or just "booster") which is driven by the brake pedal 2 to boost leg-power exerted on the brake pedal 2, 4 designates a tandem master cylinder which is actuated by the output of the booster 3 to develop brake fluid pressures, 5 designates brake cylinders which are actuated by the brake fluid pressures from the master cylinder 4 to produce braking forces for respective wheels, 6 designates a pump which is driven by an engine 7 to send hydraulic fluid to the booster 3, 8 designates a reservoir in which the hydraulic fluid is stored, and 9 designates an emergency accumulator in which an emergency fluid pressure for actuating the booster 3 is stored for actuating the booster 3 when the pump 6 fails and thus no hydraulic fluid is not supplied from the pump 6.

The open centre type booster 3 allows the free flow of the hydraulic fluid by maximizing a space of a control valve when braking operation is not performed and restricts the flow of the hydraulic fluid to develop a fluid pressure by throttling the control valve when the braking operation is performed and outputs the fluid pressure. Several types of such boosters have been known. One of such boosters (booster 3) is shown in FIG. 12. Since the booster 3 has been known in the art and a booster of the present invention will be described in detail later, the description will be made as regard to only parts relating to problems to be solved by the present invention.

FIG. 12 shows the booster in an inoperative state i.e. when the braking operation is performed. In this state, a space between a first annular groove 10 and a second annular groove 11 is maximized, the communication between the second annular groove 11 and the third annular groove 12 is interrupted, the third annular groove 12 and the fourth annular groove 13 communicate. Therefore, hydraulic fluid discharged from the pump 6 is returned to the reservoir 8 through an inlet path 14, the second annular groove 11, the space between the first annular groove 10 and the second annular groove 11, the first annular groove 10, and a circulating path 15 of the open centre type booster 3. Since the space between the first annular groove 10 and the second annular groove 11 is maximized in this case, little fluid pressure is developed in the circulating hydraulic fluid.

As the input shaft 16 moves forward by pedaling the brake pedal 2 in this state, a pair of levers 17, 18 (which are superimposed in a direction perpendicular to a surface of the drawing in FIG. 12) pivot so that the valve spool 19 moves forward. Then, the space between the first annular groove 10 and the second annular groove 11 is restricted, the communication between the second annular groove 11 and the third annular groove 12 is allowed, and the communication between the third annular groove 12 and the fourth annular groove 13 is interrupted. Because the space between the first annular groove 10 and the second annular groove 11 is restricted (the space sometimes finally becomes 0) a fluid pressure is developed in the second annular groove 11. The fluid pressure is introduced into a power chamber 23 through the space between the second annular groove 11 and the third annular groove 12, a first radial hole 20, an axial hole 21, a third check valve, and second radial holes 22 and is then exerted on a power piston 24. As a result of this, the power piston 24 produces brake operating force which is the boosted leg-power. The brake operating force is outputted by an output shaft 25 and thus operates the master cylinder 4 to actuate brakes.

The fluid pressure developed in said annular groove 11 moves a valve body 29 in a charging valve 28, which consists of a check valve, of an accumulator valve 27 to the right in FIG. 12 so as to part the valve body 29 from a rubber seat 30 to open the charging valve 28. Therefore, the fluid pressure is introduced into the emergency accumulator 9 through a space between the valve body 29 and the rubber seat 30, the periphery space of the valve body, and an accumulator path 31 and is stored in the emergency accumulator 9.

By releasing the brake pedal 2, the input shaft 16 and the valve spool 19 retreat in the inoperative position as shown in FIG. 12 so that the communication between the third annular groove 12 and the fourth annular groove 13 is allowed, the communication between the second annular groove 11 and the third annular groove 12 is interrupted, and the space between the first annular groove 10 and the second annular groove 11 becomes maximum. Therefore, the hydraulic fluid in the power chamber 23 is discharged into the reservoir 8 through the holes 22, 21, 20, the third annular groove 12, the space between the third annular groove 12 and the fourth annular groove 13, the fourth annular groove 13, and a discharge path 32. As a result of this, the power piston 24 retreats to the inoperative position and thus the brake operating force becomes extinct so that the master cylinder 4 returns in the inoperative state and thus the braking operation is canceled. Since the space between the first annular groove 10 and the second annular groove 11 becomes maximum, the fluid pressure developed in the second annular groove 11 becomes extinct. The numeral 77 designates a relief valve which opens to relieve the fluid pressure in the emergency accumulator 9 to the path 14 when the pressure stored in the emergency accumulator 9 exceeds a predetermined pressure.

When the pump 6 fails so that no fluid pressure is developed even when the space between the first annular groove 10 and the second annular groove 11 is restricted, the valve spool 19 moves forward and reaches the full-stroke point by further pedaling the brake pedal 2 largely. After the valve spool 19 reaches the full-stroke point, the brake pedal 2 is further pedaled so that the input shaft 16 further moves forward. Accordingly, the levers 17, 18 further pivot and the slide valve 33 moves forward relative to the valve spool 19. Then, the second radial holes 22 are closed so that the power chamber 23 is shut off from the pump 6. As the slide valve 33 further moves forward, a retainer 34 moves forward. A valve body 35 of a dump valve 36, which consists of a check valve, in the accumulator valve 27 is moved forward by the retainer 34 so that the dump valve 36 opens. Thus, the fluid pressure stored in the emergency accumulator 9 is introduced into the power chamber 23 whereby the power piston 24 operates. Therefore, even when the pump 6 fails, the brakes can be actuated because the leg-power is boosted by the fluid pressure in the emergency accumulator 9 during the predetermined pressure is stored in the emergency accumulator 9.

By the way, in the hydraulic brake system 1, the pressure storage to the emergency accumulator 9 is performed by introducing the fluid pressure developed during the braking operation, i.e. the discharge pressure of the pump, into the emergency accumulator 9. Therefore, when the brake operating force is small, the pressure storage to the emergency accumulator 9 is not sufficiently performed. In this case, when the pump 6 fails, the potential times that the booster can boosts the leg-power with the fluid pressure in the emergency accumulator 9 is reduced and thus the sufficient braking forces can not be provided.

SUMMARY OF THE INVENTION

The object of the present invention is to provide a hydraulic boosting device which can stores a predetermined fluid pressure in an emergency accumulator, has a simplified structure and improved reliability, and can be manufactured with low cost In order to achieve this object, the present invention provides an open centre type hydraulic boosting device, for boosting operational force and then outputs, comprising: an input shaft which is actuated by the operational force; an inlet path in which hydraulic fluid discharged from a pump is supplied; a circulating path for circulating the hydraulic fluid to a reservoir; a power chamber in which fluid pressure of the hydraulic fluid is introduced in the operative state; a power piston which is actuated by the fluid pressure in the power chamber; a control valve which is controlled by the operation of the input shaft, wherein in the inoperative state, the control valve allows the hydraulic fluid flowing though the inlet path to freely flow into the circulating path and allows the communication between the power chamber and the reservoir, and in the operative state, the control valve at least throttles the flow of the hydraulic fluid flowing through the inlet path to develop a fluid pressure and introduces the fluid pressure into the power chamber; a flow limiting means having a throttle valve which switches between a first position where the flow of the hydraulic fluid flowing through the inlet path or the circulating path is throttled so as to develop a fluid pressure and a second position where the flow of the hydraulic fluid is not throttle at all so that the hydraulic fluid flows freely; an emergency accumulator in which the fluid pressure developed by the flow limiting means is stored; and an emergency valve means which is actuated by the control valve in an emergency to introduce the fluid pressure in the emergency accumulator into the power chamber, wherein the flow limiting means includes a valve operation control means which sets the throttle valve in the first position when the fluid pressure in the emergency accumulator is spent and the fluid pressure in the emergency accumulator becomes less than a set pressure, and sets the throttle valve in the second position when the fluid pressure in the emergency accumulator exceeds the set pressure.

The present invention also provides an open centre type hydraulic boosting device, for boosting operational force and then outputs, comprising an input shaft which is actuated by the operational force; an inlet path in which hydraulic fluid discharged from a pump is supplied; a circulating path for circulating the hydraulic fluid to a reservoir; a power chamber in which fluid pressure of the hydraulic fluid is introduced in the operative state; a power piston which is actuated by the fluid pressure in the power chamber; a control valve which is controlled by the operation of the input shaft, wherein in the inoperative state, the control valve allows the hydraulic fluid flowing though the inlet path to freely flow into the circulating path and allows the communication between the power chamber and the reservoir, and in the operative state, the control valve at least restricts the flow of the hydraulic fluid flowing through the inlet path to develop a fluid pressure and introduces the fluid pressure into the power chamber; a flow limiting means having a throttle valve which switches between a first position where the flow of the hydraulic fluid flowing through the inlet path is throttled so as to develop a fluid pressure and a second position where the flow of the hydraulic fluid is not throttle at all so that the hydraulic fluid flows freely; an emergency accumulator in which the fluid pressure developed by the flow limiting means is stored; and an emergency valve means which is actuated by the control valve in an emergency to introduce the fluid pressure in the emergency accumulator into the power chamber, wherein the flow limiting means includes a valve operation control means which sets the throttle valve in the first position when the fluid pressure in the emergency accumulator is spent and the fluid pressure in the emergency accumulator becomes less than a set pressure, and sets the throttle valve in the second position when the fluid pressure in the emergency accumulator exceeds the set pressure, and wherein the hydraulic boosting device further comprises a bypass for allowing the hydraulic fluid discharged from the pump to flow into the control valve bypassing the flow limiting means, the bypass is shut off by the control valve in the inoperative state and is allowed to communicate in the operative state.

The present invention also provides an open centre type hydraulic boosting device, for boosting operational force and then outputs, comprising: an input shaft which is actuated by the operational force; an inlet path in which hydraulic fluid discharged from a pump is supplied; a circulating path for circulating the hydraulic fluid to a reservoir; a power chamber in which fluid pressure of the hydraulic fluid is introduced in the operative state; a power piston which is actuated by the fluid pressure in the power chamber; a control valve which is controlled by the operation of the input shaft, wherein in the inoperative state, the control valve allows the hydraulic fluid flowing though the inlet path to freely flow into the circulating path and allows the communication between the power chamber and the reservoir, and in the operative state, the control valve at least restricts the flow of the hydraulic fluid flowing through the inlet path to develop a fluid pressure and introduces the fluid pressure into the power chamber; an emergency accumulator in which an emergency fluid pressure is stored for operating the power piston in an emergency such as in a case of the pump failure; a flow limiting means in which a first state, a second state and a third state are set, wherein the flow limiting means set in the first state throttles a path allowing the communication between the pump and the emergency accumulator by a first throttle valve and interrupts the communication between the pump and the inlet path when the pump is not driven and throttles the hydraulic fluid discharged from the pump by the first throttle valve to develop a first fluid pressure when the pump is started, the flow limiting means set in the second state is operated with the first fluid pressure to throttle and allow the communication between the pump and the inlet path by a second throttle valve, to little throttle the path allowing the communication between the pump and the emergency accumulator, and to throttle the hydraulic fluid discharged from the pump to supply the hydraulic fluid into the inlet path and develop a second fluid pressure greater than the first fluid pressure to supply the second fluid pressure into the emergency accumulator when the pressure in the emergency accumulator is less than a set pressure, and the flow limiting means set in a third state little throttles the communication between the pump and the inlet path when the pressure in the emergency accumulator exceeds the set pressure; and an emergency valve means which is actuated by the operation of the control valve in an emergency to introduce the fluid pressure in the emergency produced by the flow limiting means into the power chamber.

In the present invention as structured above, when the fluid pressure in the emergency accumulator is less than the set pressure, the valve operation control means sets the throttle valve in the first position whereby the hydraulic fluid flowing through the inlet path or the circulating path is throttled so as to develop a fluid pressure which is then stored in the emergency accumulator. When the fluid pressure in the emergency accumulator exceeds the set pressure, the valve operation control means sets the throttle valve in the second position whereby the hydraulic fluid flowing through the inlet path or the circulating path is not throttled to flow freely and the hydraulic boosting device is not influenced by the valve operation control means so as to operate the normal operation.

In this manner, when the fluid pressure in the emergency accumulator is less than the set pressure, a fluid pressure is always and automatically developed so that the emergency accumulator can always store the set pressure. Therefore, even when no fluid pressure is developed by the operation of the control valve due to the pump failure, the hydraulic boosting device can perform the boosting operation more times than the conventional one, thereby improving the safety of the operation of the hydraulic boosting device.

Since the flow limiting means can operate with the action of the fluid pressure in the emergency accumulator, the flow limiting means having the throttle valve an the valve operation control means can be mechanically structured, thereby making the structure of the flow limiting means simple and further ensuring the operation. As a result, the reliability of the hydraulic boosting device is improved and the hydraulic boosting device can be manufactured at low cost.

According to the present invention, during normal operation of the hydraulic boosting device, the control valve allow the communication through the bypass. Thus, the hydraulic fluid discharged form the pump flows into the control valve through the bypass bypassing the flow limiting means during the normal operation. Therefore, even when the normal operation is performed during the flow limiting means throttles the flow rate of the hydraulic fluid flowing the control valve, the hydraulic boosting device can boosts the operating force to the same predetermined degree as normal cases so as to ensure the normal positive operation.

Also according to the present invention, the flow limiting means is set in the first state when the pump is not driven where the hydraulic fluid discharged from the pump is throttled by the first throttle valve to develop the first fluid pressure. When the pressure in the emergency accumulator is less than the set pressure, the flow limiting means is set in the second state from the first state, the hydraulic fluid discharged from the pump is throttled by the second throttle valve and is supplied to the control valve. Since the hydraulic fluid is throttled by the second throttle valve to develop the second fluid pressure which is then supplied into the emergency accumulator.

When the fluid pressure in the emergency accumulator exceeds the set pressure, the flow limiting means is set in the third state where the hydraulic fluid discharged form the pump is little throttled by the second throttle valve and is thus supplied to the control valve.

When the fluid pressure exceeding the set pressure is stored in the emergency accumulator, when the pump is started, the flow limiting means is directly set by the fluid pressure of the hydraulic fluid discharged from the pump.

As a result of this, when the pump is started during the pressure in the emergency accumulator is less than the set pressure, the hydraulic fluid discharged from the pump is throttled by the second throttle valve of the flow limiting means and then flows into the emergency accumulator, thereby diluting the rushing pressure of the emergency accumulator and relieving the impact to the emergency accumulator due to the rushing pressure when the pump is actuated.

Moreover, since the flow limiting means is controlled by the first and second fluid pressures and the fluid pressure in the emergency accumulator, the fluid pressure in the emergency accumulator can rapidly reach the set pressure and the precision of storage control to the set pressure is improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8 is a longitudinal sectional view showing a part of a fourth embodiment of the present invention, FIG. 9 is a longitudinal sectional view showing another part of the fourth embodiment of the present invention, FIG. 10 shows a variation of the fourth embodiment shown in FIG. 8 and FIG. 9, (a) is a front view thereof, and (b) is a left-side view thereof.

DESCRIPTION OF THE PREFERRED EMBODIMENTS

Figure 1:
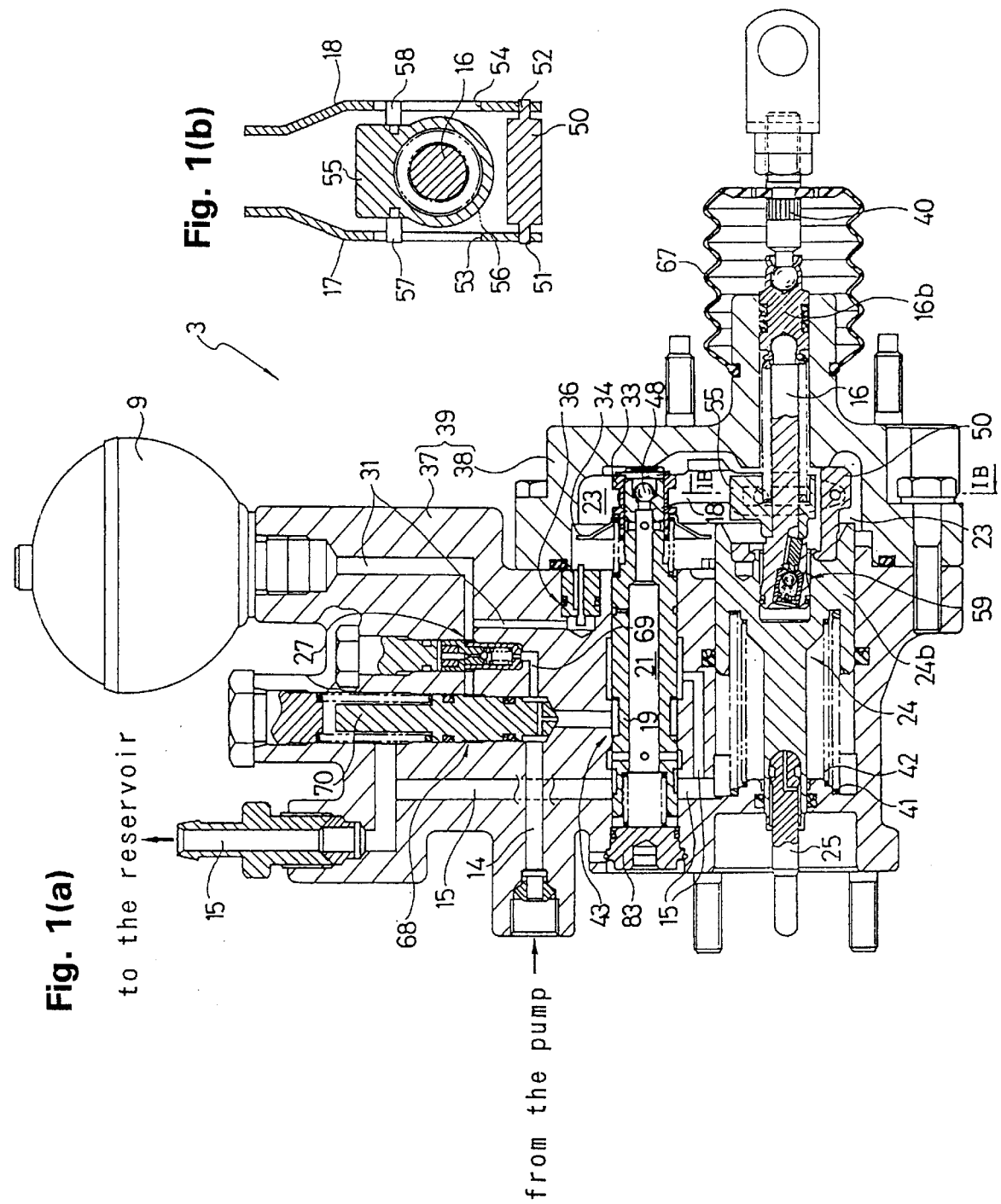
FIG. 1 shows a first embodiment in which a hydraulic boosting device is applied to a brake booster according to the present invention, (a) is a longitudinal sectional view thereof, and (b) is a sectional view taken along a line IB—IB of (a)
Figure 11:
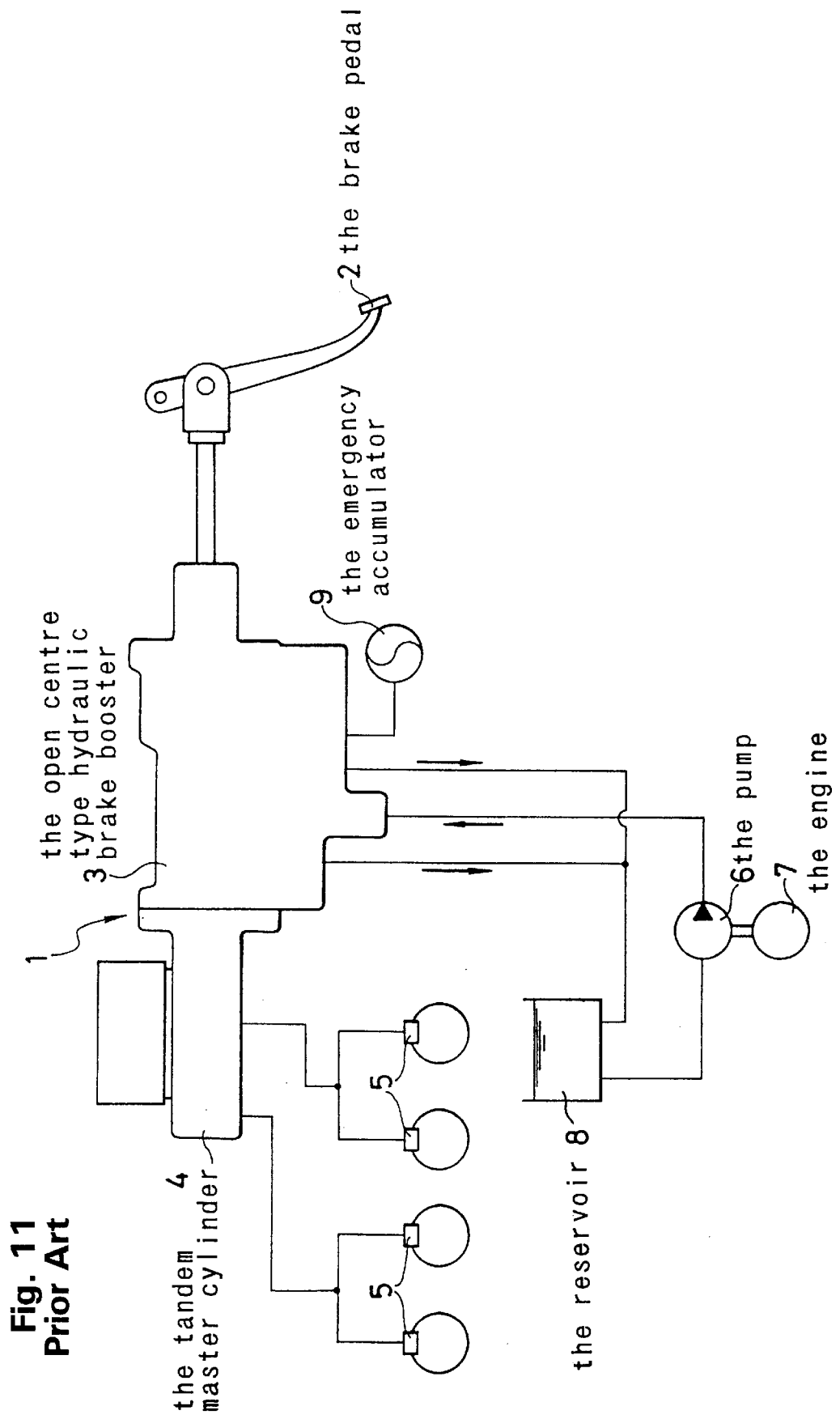
FIG. 11 is a view showing an example of a conventional hydraulic boosting system.

FIG. 1 shows a first embodiment in which a hydraulic boosting device is applied to a brake booster according to the present invention, (a) is a longitudinal sectional view thereof, and (b) is a sectional view taken along a line IB—IB of (a). It should be noted that parts similar or corresponding to the parts of the conventional system shown in FIG. 11 and FIG. 12 will be marked by the same reference numerals.

As shown in FIG. 1(a), the brake booster 3 in which the hydraulic boosting device of the first embodiment is applied has a housing 39 comprising a front housing 37 and a rear housing 38. Hermetically and slidably inserted into the rear housing 38 is an input shaft 16 joined to a brake pedal not shown through a joint member 40. Hermetically and slidably inserted into the front housing 37 is a power piston 24. The power piston 24 is always biased to the right in FIG. 1(a) by a pair of return springs 41, 42 concentrically arranged. An output shaft 25 is inserted in and in contact with the front end of the power piston 24. The output shaft 25 transmits the output of the power piston 24 to a piston of the master cylinder 4 to operate the piston. Formed in the housing 39 between the front housing 37 and the rear housing 38 is a power chamber 23 which the rear face of the piston portion 24b of the power piston 24 faces.

Figure 2:
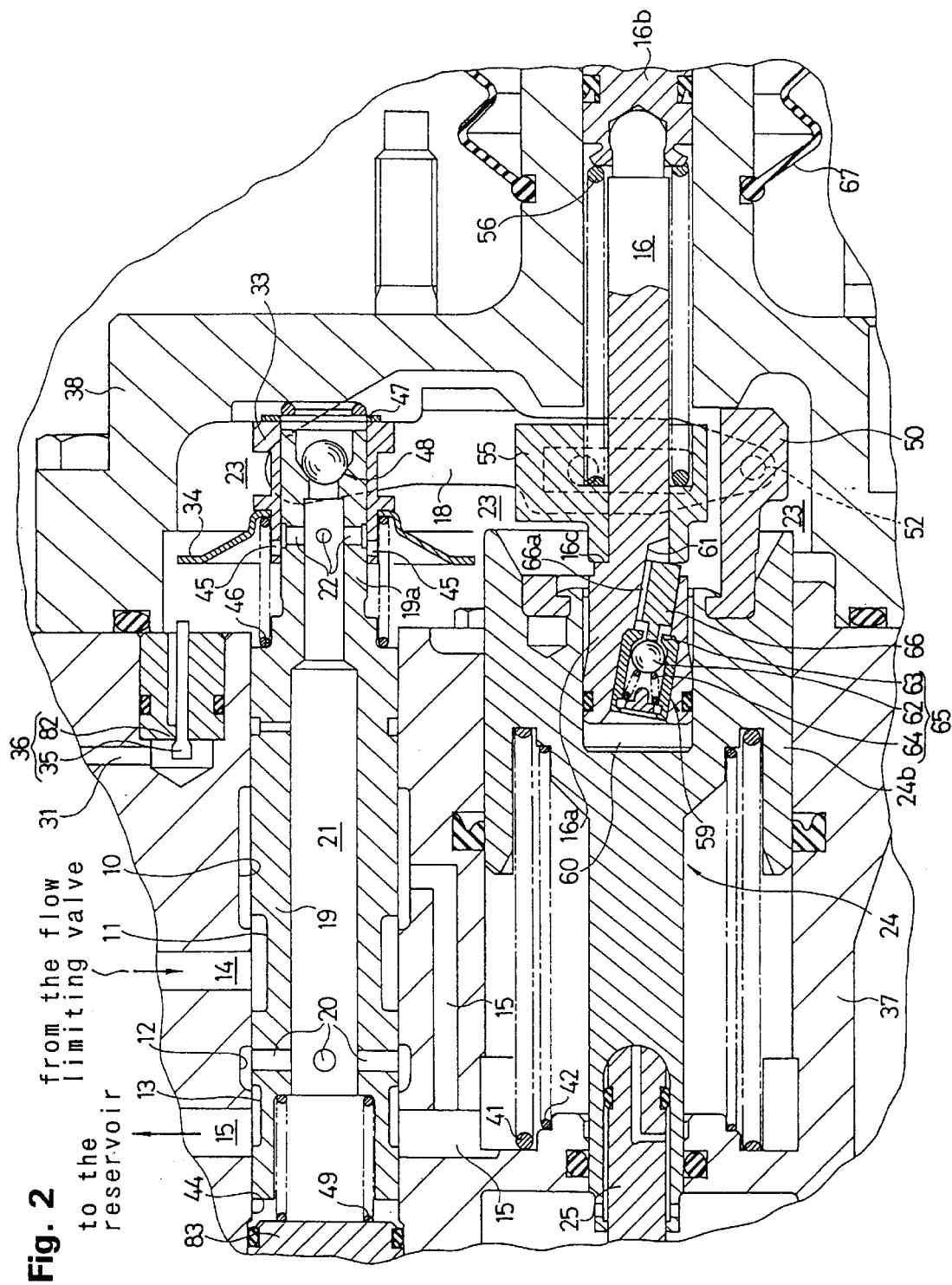
FIG. 2 is an enlarged sectional view of a part of the brake booster of the first embodiment shown in FIG. 1.

Arranged above the power piston 24 in the front housing 37 is a control valve 43. As shown in FIG. 2 in detail, the control valve 43 is provided with a cylindrical valve spool 19 slidably inserted in a hole 44 of the front housing 37. A first annular groove 10 and a third annular groove 12 are formed in the inner surface of the hole 44 of the front housing 37 while a second annular groove 11 and a fourth annular groove 13 are formed in the outer periphery of the valve spool 19.

The valve spool 19 is provided with an axial hole 21 formed therein to axially penetrate and with first radial holes 20 formed at a position corresponding to the third annular groove 12 in such a manner as to communicate the third annular groove 12 and the axial hole 21. The valve spool 19 is also provided with second radial holes 22 formed in a rear end portion 19a thereof extending in the power chamber 23 in such a manner as to communicate the power chamber 23 and the axial hole 21.

Slidably fitted onto the circumference of the rear end portion 191a of the valve spool 19 in which the second radial holes 22 are formed is a cylindrical slide valve 33 having third radial holes 45. The slide valve 33 is always biased rearward (to the right in FIG. 2) by a spring 46 and is in contact with a stopper 47 fixed on the rear end of the valve spool 19 in the inoperative state. In this position where the slide valve 33 is in contact with the stopper 47, the second radial holes 22 and the third radial holes 45 are aligned and the axial hole 21 and the power chamber 23 communicate through the second radial holes 22 and the third radial holes 45. When the slid valve 33 moves forward to the valve spool 19 against the biasing force of the spring 46, the third radial holes 45 are shifted from the second radial holes 22 so as to interrupt the communication between the axial hole 21 and the power chamber 23 through the holes 22, 45.

Moreover, the right end of the axial hole 21 of the valve spool 19 opens in the power chamber 23. Disposed on the open end is a third check valve which allows the flow of hydraulic fluid from the axial hole 21 toward the power chamber 23 and interrupts the flow of hydraulic fluid from the power chamber 23 toward the axial hole 21.

The first annular groove 10 always communicates with a reservoir 8 through a circulating path 15. The second annular groove 11 always communicates with an inlet path 14 connected to a pump 6 as a fluid pressure source. The third annular groove 12 always communicates with the axial hole 21 through the first radial holes 20. The third annular groove 12 is interrupted from the second annular groove 11 and communicates with the fourth annular groove 13 in the inoperative state while it communicates with the second annular groove 11 and is interrupted from the fourth annular groove 13 in the operative state. The fourth annular groove 13 always communicates with the circulating path 15 connected to the reservoir 8. That is, a part of the circulating path 15 also functions as a discharge path 32 shown in FIG. 12.

The valve spool 19 is always biased rearward by the spring 49. In the inoperative state, the valve spool 19 is in the rearmost position (i.e. the inoperative position) where the rear end of the valve spool 19 is in contact with the rear housing 38. In the inoperative position of the valve spool 19, the communicating area between the first annular groove 10 and the second annular groove 11 is maximum. As the pump 6 is therefore driven, the hydraulic fluid in the reservoir 8 supplied by the pump 6 is returned to the reservoir 8 through the inlet path 14, the second annular groove 11, the first annular groove 10, and the circulating path 15. That is, the hydraulic fluid circulates. Since the communicating area between the first annual groove 10 and the second annular groove 11 is maximum at this point, the circulating flow of the hydraulic fluid is not throttled at all so that no fluid pressure is developed in the second annular groove 11. When the valve spool 19 operates to move forward, the communicating area between the first annular groove 10 and the second annular groove 11 gradually decreases and finally becomes substantially 0 whereby the flow of the hydraulic fluid from the pump 6 is throttled so that a fluid pressure is developed in the second annular groove 11.

Fixed to the rear end of the power piston 24 is a lever supporting member 50 so that respective one end of a pair of levers 17, 18 are pivotally supported by a pair of supporting pins 51, 52 projecting from the lever supporting member 50 in the lateral direction perpendicular to the axial direction of the input shaft 16 as shown in FIG. 1(b) in detail. As shown in FIG. 1(a), the other ends of the levers 17, 18 are pivotally supported by supporting pins not shown projecting from the slide valve 33. The levers 17, 18 are provided with elongate holes 53, 54 extending in the longitudinal direction of the levers 17, 18 near the one end, respectively.

A cylindrical valve controlling member 55 is slidably fitted onto the circumference of the input shaft 16. The valve controlling member 55 is always biased to the left by a coil spring 56 compressed between the valve controlling member 55 and a rear member 16b of the input shaft 16 and is in contact with a step portion 16c of a front portion 16a of the input shaft 16 in the inoperative state. As shown in FIG. 1(b), the valve controlling member 55 is provided with a pair of engaging pins 57, 58 projecting in the lateral direction perpendicular to the axial direction of the input shaft 16. The engaging pins 57, 58 project through the elongate holes 53, 54 of the levers 17, 18, respectively. The engaging pins 57, 58 come in contact with inner walls of the elongate holes 53, 54 of the levers 17, 18 when the engaging pins 57, 58 move in the axial direction.

The front portion 16a of the input shaft 16 is provided with a travel limiter 59. The travel limiter 59 comprises a normally open switching valve 65 in a path 61 communicating a chamber 60 and the power chamber 23, and a press pin 66 slidably inserted in the path 61. The switching valve 65 includes a valve ball 62, a valve seat 63 in which the valve ball 62 is seated, and a spring 64. The press pin 66 for controls the switching of the switching valve 65 by pressing the valve ball 62.

In the travel limiter 59, when the valve controlling member 55 is in contact with the step portion 16c and the press pin 66 is pressed to the left in FIG. 2, the press pin 66 presses the valve ball 62 in such a manner as to detach the valve ball 62 from the valve seat 63 to open the switching valve 65 whereby the power chamber 23 and the chamber 60 communicate through an axial groove 66a formed in the outer surface of the press pin 66 and the open switching valve 65. When the power chamber 23 and the chamber 60 communicate as described above, the input shaft 16 can move axially relative to the power piston 24. On the other hand, when the press pin 66 is not pressed by the valve control member 55, the press pin 66 does not press the valve ball 62 at all. Therefore, in this state, the valve ball 62 is seated in the valve seat 63 by the biasing force of the spring 64 to close the switching valve 65 whereby the communication between the power chamber 23 and the chamber 60 is interrupted and the chamber 60 is thus hermetically sealed. When the chamber 60 is hermetically sealed as described above, the input shaft 16 cannot move axially relative to the power piston 24.

The respective forces of the spring 41, 42, 46, 49, and 56 are set in such a manner that when the normal braking is performed and the input shaft 16 therefore moves forward, the springs 41, 42 are first compressed, then the spring 49 is compressed, then the spring 56 is compressed, and finally the spring 46 is compressed.

The numeral 67 designates a boot made of flexible rubber disposed between the rear hosing 38 and the joint member 40. The boot 58 prevents a foreign material from invading the outer surface of the rear member 16b of the input shaft 16.

By the way, the booster 3 of this first embodiment is provided with a flow limiting valve 68 disposed on the way of inlet path 14 as shown in FIG. 1(a). The inlet path 14 and an accumulator path 31 communicate through a path 69 on which an accumulator valve 27 is disposed.

Figure 3:
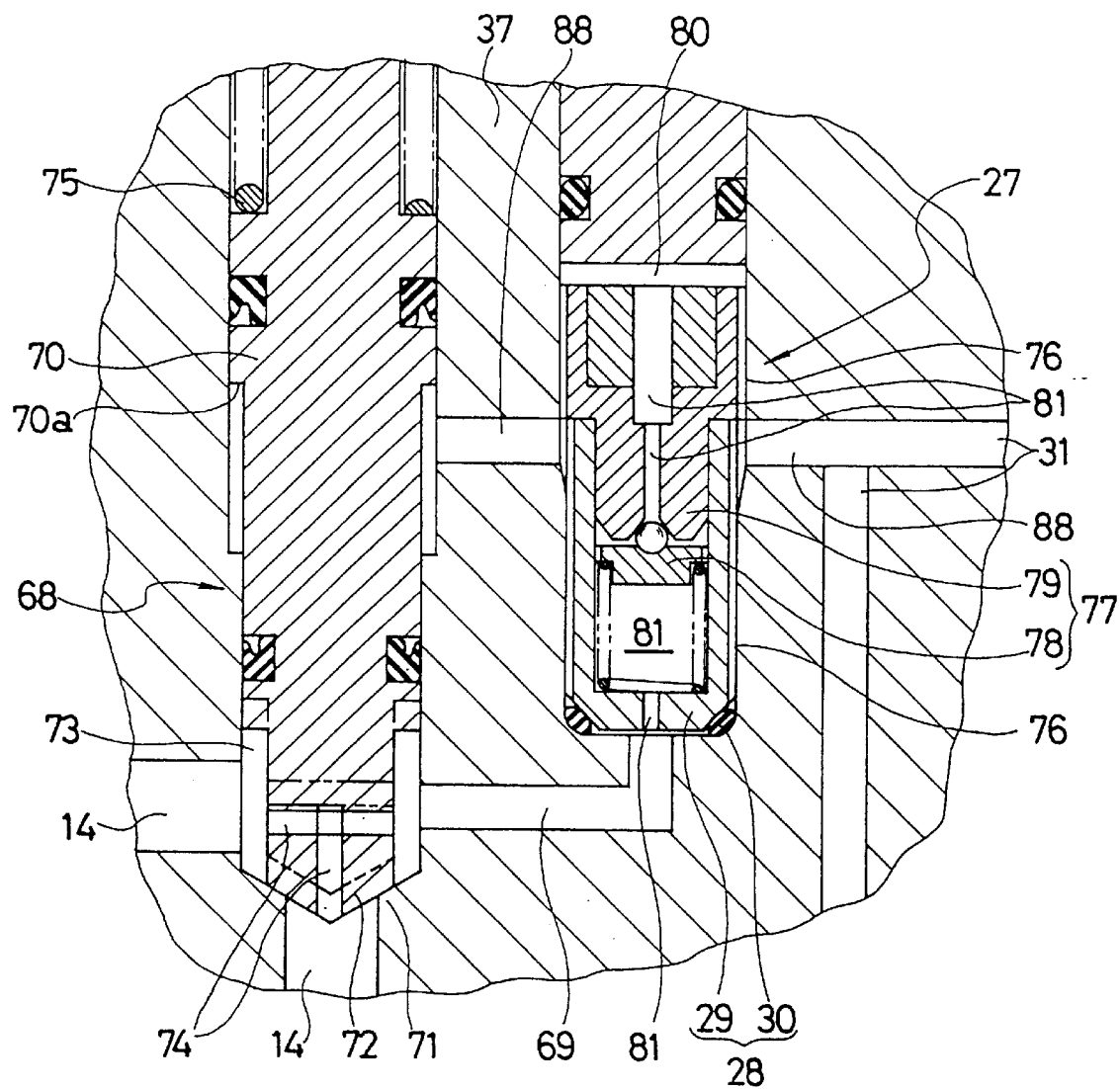
FIG. 3 is an enlarged sectional view of another part of the brake booster of the first embodiment shown in FIG. 1.

As shown in FIG. 3, the flow limiting valve 68 has a stepped piston 70 slidably and hermetically disposed in the front housing 37. Formed in the lower end portion of the stepped piston 70 are a conical throttle valve 72 which can be seated in a valve seat 71 formed in the front housing 37, an annular path 73, having relatively large sectional area, formed in a reduced diameter portion around the lower end portion, and a T-like throttle path 74 opening to the annular path 73 and to the lower end of the stepped piston 70. The throttle path 74 is set to have a smaller diameter as compared to the inlet path 14. The stepped piston 70 is always biased by a spring 75 in such a direction that the throttle valve 72 is seated in the valve seat 71. Further, the fluid pressure in the emergency accumulator 9 is always exerted on the step portion 70a of the stepped piston 70 in the direction opposite to the spring force of the spring 75 through a path 88 branched from the accumulator path 31.

The spring force of the spring 75 and the effective receiving area of the step portion 70a are set in such a manner that when the pressure stored in the emergency accumulator 9 exceeds a set pressure, the stepped piston 70 moves upward by the fluid pressure in the emergency accumulator 9 against the spring force of the spring 75 so that the throttle valve 72 is set in a second position apart from the valve seat 71 as shown by two-dot chain lines, and when the pressure stored in the emergency accumulator 9 is less than the set pressure, the stepped piston 70 moves downward by the spring force of the spring 75 so that the throttle valve 72 is in a first position where it is seated in the valve seat 71.

Then, when the throttle valve 72 is seated in the valve seat 71, the hydraulic fluid discharged from the pump 6 flows only through the throttle path 74 and the flow of the hydraulic fluid is thus throttled so that a fluid pressure is developed in the annular path 73. When the throttle valve 72 is apart from the valve seat 71, the hydraulic fluid discharged from the pump 6 flows mainly through the space between the throttle valve 72 and the valve seat 71 and the flow of the hydraulic fluid is thus not throttled at all so that no fluid pressure is developed in the annular path 73.

The inlet path 14 arranged upstream of the flow limiting valve 68 and the path 69 always communicate through the annular path 73.

On the other hand, the accumulator valve 27 has a charging valve 28 comprising a valve body 29 slidably disposed in the front hot using 37 and a rubber sheet 30 in which the valve body 29 can be seated. The charging valve 28 allows only the flow in a direction from the inlet path 14 to the emergency accumulator 9. In this case, the hydraulic fluid passing through the path 69 flows toward the emergency accumulator 9 through a space 76 between the circumstance of the valve body 29 and the front housing 37 after opening the charging valve 28.

The valve body 29 is provided with a relief valve 77 which comprises a valve body 78 having a valve ball and a valve seat 79 in which the valve body 78 can be seated. The valve body 78 is seated in the valve seat 79, i.e. the relief valve 77 closes, when the pressure stored in the emergency accumulator 9 is less than the set pressure, the valve body 78 is parted from the valve seat 79, i.e. the relief valve 77 opens, when the pressure stored in the emergency accumulator 9 exceeds the set pressure. When the relief valve 77 opens, the fluid pressure stored in the emergency accumulator 9 is relieved toward the path 69 through a space 76, a chamber 80 above the valve body 78, and a longitudinal through hole 81 formed in the center of the valve body 78.

The front housing 37 is also provided with a dump valve 36 disposed at an opening, toward the power chamber 23, of the accumulator path 31 as another part of the accumulator valve 27 as shown in FIG. 1(a). As shown in FIG. 2, the dump valve 36 comprises a valve body 35 slidably disposed and a valve seat 82 in which the valve body 35 can be seated. When a retainer 34 moves forward to predetermined distance, the valve body 35 is moved apart from the valve seat 82 by the retainer 34 so that the dump valve 36 opens.

In the brake booster 3 of this embodiment as structured above, the input shaft 16 and the valve spool 19 of the control valve 43 are in the inoperative positions as shown when the braking operation is not performed. In this state, when the pressure stored in the emergency accumulator 9 is less than the set pressure, the stepped piston 70 moves downward so that the throttle valve 72 is set in the first position where it is seated in the valve seat 71 as shown by solid lines in FIG. 3. Therefore, the hydraulic fluid from the pump 6 is throttled by the flow limiting valve 68 as mentioned above, thereby developing a fluid pressure in the annular path 73. The fluid pressure is stored in the emergency accumulator 9 through the accumulator valve 27 and the accumulator path 31.

As the pressure stored in the emergency accumulator 9 exceeds the set pressure, the stepped piston 70 moves upward so that the throttle valve 72 is set in the second position where it is apart from the valve seat 71 as shown by the two-dot chain lines in FIG. 3. Since the hydraulic fluid from the pump 6 is therefore not restricted at all by the flow limiting valve 68 as mentioned above, the hydraulic fluid flows to the second annular groove 11. The hydraulic fluid is returned to the reservoir 8 again through the second annular groove 11 and the circulating path 15 in such a manner that the hydraulic fluid circulates. In this state, no fluid pressure is developed in the annular path 73 while the fluid pressure stored in the emergency accumulator 9 does not leak out to the annular path 73 by the charging valve 28 and does not invade into the power chamber 23 by the dump valve 36.

As the braking operation is performed by pedaling the brake pedal 2, the input shaft 16 and the valve control member 55 integrally move forward. Then, the engaging pins 57, 58 first come in contact with the side walls of the elongate holes 53, 54 so that the levers 17, 18 pivot about the supporting pins of slide valve 33 in the clockwise direction in FIG. 2. Therefore, the power piston 24 moves forward so that the output shaft 25 moves forward to push the piston of the master cylinder 4.

As developing the fluid pressure in the master cylinder 4 according to the movement of the piston of the master cylinder 4, the forward movement of the power piston 24 is substantially finished. As the input shaft 16 further moves forward, the levers 17, 18 pivot about the supporting pins 51, 52 in the counter-clockwise direction in FIG. 2. Then, the other ends of the levers 17, 18 press the valve spool 19 through the slide valve 33 so that the valve spool 19 moves forward. Therefore, the communication between the third annular groove 12 and the fourth annular groove 13 is interrupted, the space between the first annular groove 10 and the second annular groove 11 is restricted, and the communication between the second annular groove 11 and the third annular groove 12 is allowed. Therefore, a fluid pressure is developed in the second annular groove 11. The developed fluid pressure is supplied to the power chamber 23 not only through the second annular groove 11, the third annular groove 12, the first radial holes 20, the axial hole 21, and the third check valve, but also through the axial hole 21 and the second and third radial holes 22, 45. As a result of this, the power piston 24 further moves forward so as to boost the leg-power exerted on the brake pedal 2 and then outputs. The piston of the master cylinder 4 is further pushed by the output of the power piston 24 through the output shaft 25 so that the master cylinder 4 outputs large fluid pressures. The braking is operated with the fluid pressures of the master cylinder 4.

At the same time, the fluid pressure in the power chamber 23 presses the input shaft 16 to the right. The input shaft 16 is held in a state where the force pressing the input shaft 16 to the right and the force exerted on the input shaft 16 to the left by the leg-power on the brake pedal 2 are in balance. In this manner, the fluid pressure corresponding to the leg-power exerted on the brake pedal 2 is supplied to the power chamber 23. As the forward movement of the input shaft 16 increases with an increase in the leg-power on the brake pedal 2, the forward movement of the valve spool 19 also increases so that the space between the first annular groove 10 and the second annular groove 11 decreases (the space sometimes finally becomes 0). As the decrease in the space causes an increase the developed fluid pressure, the fluid pressure in the power chamber 23 also increases. As a result of this, the output of the power piston 24 increases and the master cylinder fluid pressure also increases.

With the release of the power exerted on the brake pedal 2 for canceling the braking operation, the input shaft 16 retreats. Then, the levers 17, 18 pivot about the supporting pins 51, 52 in the clockwise direction so that the valve spool 19 moves toward the inoperative position. Therefore, the space between the first annular groove 10 and the second annular groove 11 becomes maximum so that the flow of the hydraulic fluid from the pump 6 is not restricted and the fluid pressure developed in the second groove 11 is discharged to the reservoir 8 through the circulating path 15. The result is extinction of the fluid pressure in the second groove 11. Also as a result, the communication between the second annular groove 11 and the third annular groove 12 is interrupted and the communication between the third annular groove 12 and the fourth annular groove 13 is allowed. Then, the fluid pressure supplied to the power chamber 23 is also discharged to the reservoir 8 through the third radial holes 45, the second radial holes 22, the axial hole 21, the first radial holes 20, the third annular groove 12, the fourth annular groove 13, and the circulating path 15. The result is extinction of the fluid pressure in the power chamber 23 too. The power piston 24 therefore retreats toward the inoperative position. As the valve spool 19 is in the rearmost position where the rear end of the valve spool 19 is in contact with the rear housing 38, the levers 17, 18 pivot about the supporting pins of the slide valve 33 in the counter-clockwise direction. Thus, the power piston 24 becomes in the inoperative position so as to output nothing so that the master cylinder 4 is also in the inoperative position, thereby canceling the braking.

When the braking operation is performed, with an increase in the power exerted on the brake pedal 2, the front end of the valve spool 19 comes in contact with the plug 83 closing the hole 44 of the front housing 37. That is, as the valve spool 19 reaches the full-stroke point, the fluid pressure in the power chamber 23 stops increasing. This point is the full load point of the brake booster 3. As further power is exerted on the brake pedal 2 even after the full load point, only the input shaft 16 moves forward while the valve spool 19 does not move forward and the levers 17, 18 little pivot.

Therefore, the input shaft 16 moves forward relative to the valve control member 55 against the spring force of the spring 56. Then, the valve control member 55 no longer presses the press pin 66 and the press pin 66 therefore no longer presses the valve ball 62. As a result, the valve ball 62 is seated in the valve seat 63 whereby the switching valve 65 is closed to hermetically seal the chamber 60. That is, the travel limiter 59 is actuated. Accordingly, the force exerted on the input shaft 16 by the leg-power on the brake pedal 2 is directly exerted on the power piston 24. In such a manner, the output of the brake booster 3 increases only by the increase in the input of the input shaft 16 after the full load point of the brake booster 3.

When the input shaft 16 further moves forward after the valve spool 19 reaches the full-stroke point, the slide valve 33 moves forward relative to the valve spool 19 against the spring force of the spring 46 through the levers 17, 18. Thus, the retainer 34 disposed on the slide valve 33 also moves forward and moves the valve body 35 forward to open the dump valve 36 so that the power chamber 23 communicates with the emergency accumulator 9. Since, however, the pressure stored in the emergency accumulator 9 is the same as the fluid pressure of the power chamber 23 at the full load point, the fluid pressure of the power chamber 23 is the same as the fluid pressure at the full load point.

If the pump 6 fails, even both the input shaft 16 and the valve spool 19 move forward, no fluid pressure is developed in the second annular groove 11 so that no fluid pressure is supplied to the power chamber 23. Therefore, the brake booster 3 does not work. However, after the input shaft 16 further moves forward and the valve spool 19 reaches the full-stroke point as mentioned above, the slide valve 33 moves forward relative to the valve spool 19 through the levers 17, 18. Thus, the third radial holes 45 of the slide valve 33 are shifted from the second radial holes 22 of the valve spool 19 so that the communication between the axial hole 21 and the power chamber 23 through the second and third radial holes 22, 45 is interrupted by the slide valve 33. As the slide valve 33 further moves forward, the retainer 34 moves the valve body 35 forward to open the dump valve 36 so that the power chamber 23 communicates with the emergency accumulator 9. As a result of this, the fluid pressure in the emergency accumulator 9 is supplied to the power chamber 23 until the fluid pressure in the power chamber 23 increases to the same pressure at the full load point. The brake booster 3 is actuated by the fluid pressure in the power chamber 23. In this manner, even when the pump 6 fails, the booster 3 can produce the predetermined outputs during pressure is stored in the emergency accumulator 9.

When, in rare cases, the braking operation is performed during the fluid pressure in the emergency accumulator 9 is less than the set pressure and the flow limiting valve 68 restricts the flow of the hydraulic fluid flowing into the second annular groove 11 through the inlet path 14, the hydraulic fluid flowing into the second annular groove 11 sometimes becomes insufficient for the boosting operation of the brake booster 3. However, in this case as the same as the case of the aforementioned pump 6 failure, the fluid pressure in the emergency accumulator 9 is supplied to the power chamber 23 by that the retainer 34 opens the dump valve 36 after the valve spool 19 reaches the full-stroke point. The booster 3 therefore operates with the fluid pressure thus supplied. That is, also in this case, the booster 3 can securely performs the boosting operation to some extent.

Since, as mentioned above, the brake booster 3 of the hydraulic boosting device according to the first embodiment can produce a fluid pressure by restricting the hydraulic fluid flowing through the inlet path 14 by the flow limiting valve 68 and automatically store the fluid pressure in the emergency accumulator 9 whenever the pressure stored in the emergency accumulator 9 is less than the set pressure, the emergency accumulator 9 can securely always have the set pressure. Therefore, when the pump 6 fails, the brake booster 3 can perform the boosting operation more times than the conventional one. That is, even when no fluid pressure is developed by the operation of the control valve 43 due to the pump 6 failure and the like, the brake booster 3 securely perform the braking operation predetermined times with the fluid pressure in the emergency accumulator 9, thereby improving the safety of the hydraulic brake system.

Since the flow limiting valve 68 consists mechanically of the stepped piston 70 in which the fluid pressure in the emergency accumulator 9 is exerted, the throttle valve 72 disposed on the end of the stepped piston 70 and having the throttle path 74, the valve seat 71 in which the throttle valve 72 can be seated, and the spring 75, the flow limiting valve 68 has a simple structure and reliable operation. As a result, the reliability of the brake booster 3 is improved and can be manufactured at low cost.

Figure 4:
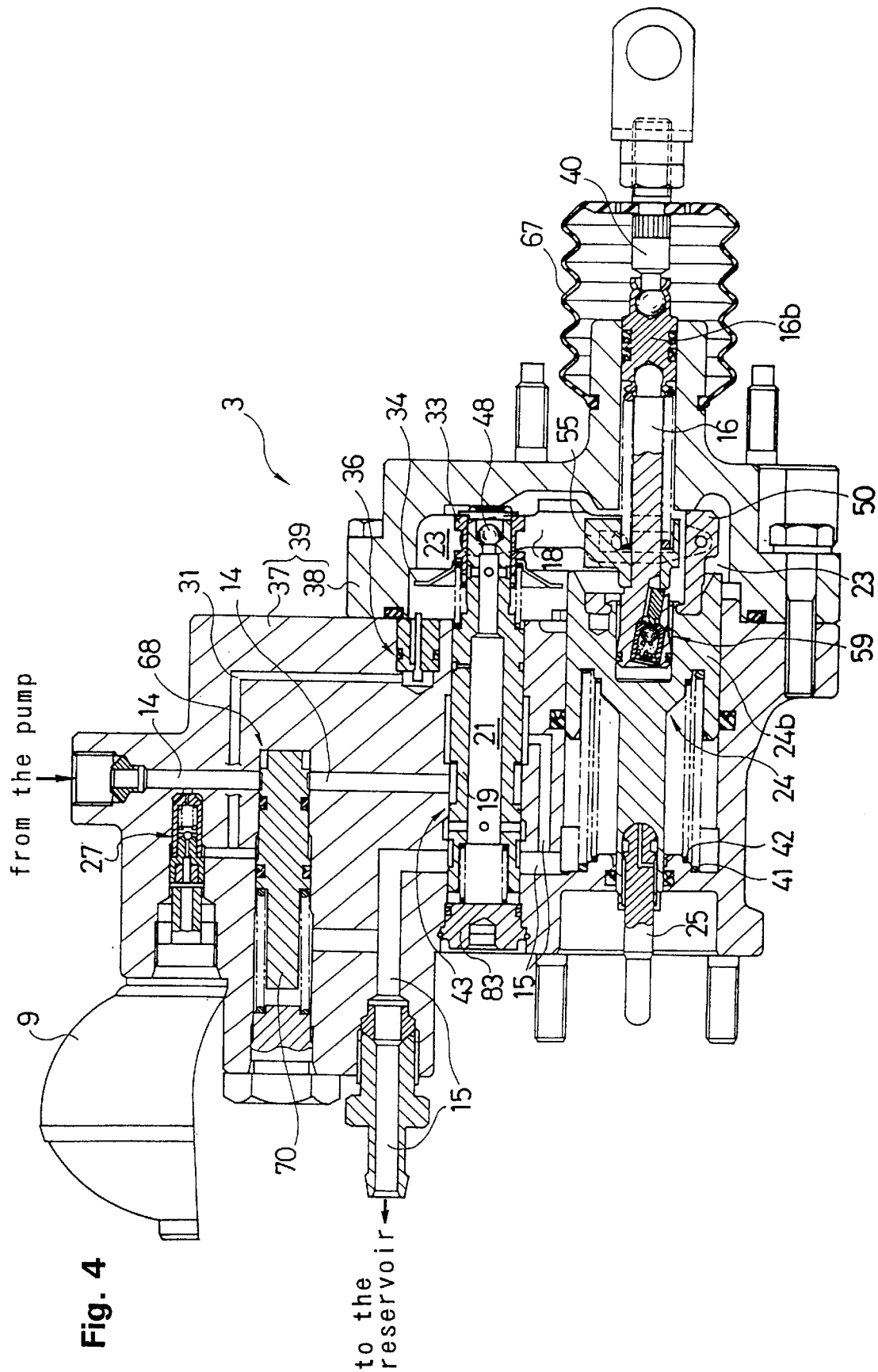
FIG. 4 is a longitudinal sectional view of a second embodiment of the present invention.

FIG. 4 is a longitudinal sectional view similar to FIG. 1(a) showing a second embodiment of the present invention. It should be noted that parts similar or corresponding to the parts of the above first embodiment will be marked by the same reference numerals so that the description about the parts will be omitted.

Though the charging valve 28 and the relief valve 77 of the accumulator valve 27 and the flow limiting valve 68 are arranged in the direction perpendicular to the valve spool 19 and the power piston 24 in the above first embodiment, a charging valve 28 and a relief valve 77 of a accumulator valve 27 and a flow limiting valve 68 are arranged in the direction parallel to a valve spool 19 and a power piston 24 in the second embodiment.

Though the throttle means formed in the stepped piston 70 of the flow limiting valve 68 constitutes of the conical throttle valve 72 for opening and closing the inlet path 16, the valve seat 71, and the throttle path 74 having a small diameter in the above first embodiment, a throttle means constitutes of a spool valve as shown in FIG. 4 in the second embodiment.

Figure 5:
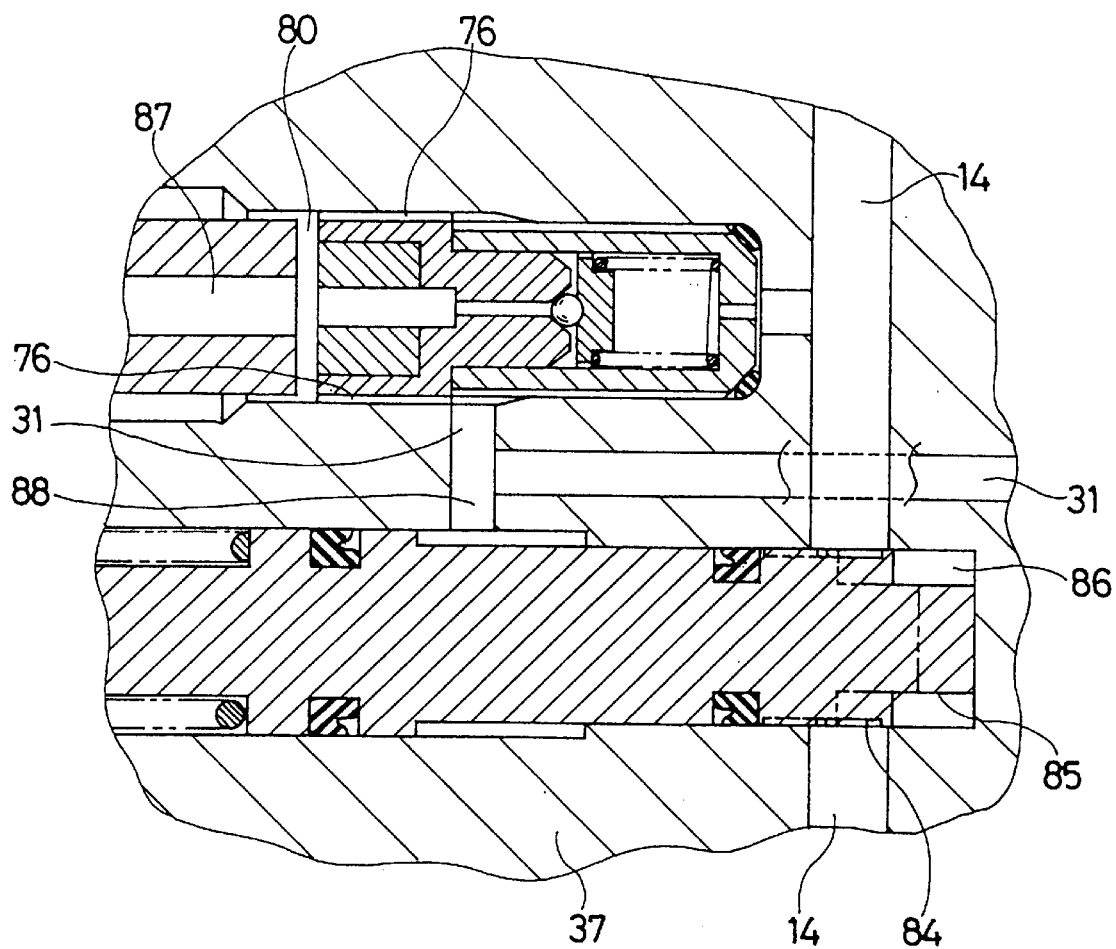
FIG. 5 is a partly enlarged sectional view of a brake booster of the second embodiment shown in FIG. 4.

As shown in FIG. 5 in detail, a chamber 80 formed on the left side of the charging valve 28 communicates with an emergency accumulator 9 through a path 87 formed as a part of an accumulator path 31. Therefore, a fluid pressure developed in the inlet path 14 by the flow limiting valve 68 moves a valve body 29 to the left to open the charging valve 28 and is then stored in the emergency accumulator 9 through a space 76 between the circumference of the valve body 29 and a front housing 37, the chamber 80, and the path 87.

The flow limiting valve 68 is provided with an annular throttle groove 84 having a small section formed in a right end portion of a stepped piston 70 and a smaller diameter portion 85 formed on the right end of the stepped piston 70 whereby an annular path 86 having a relatively large section area is formed between the smaller diameter portion 85 and the front housing 37.

When the fluid pressure in the emergency accumulator 9 is less than the set pressure, the stepped piston 70 is set in a position shown by solid lines in FIG. 5 by the spring force of a spring 75. In this position, only the annular throttle groove 84 faces the inlet path 14. As a result of this, the hydraulic fluid flowing through the inlet path 14 from a pump 6 is throttled by the annular throttle groove 84 so as to develop a fluid pressure in the inlet path 14 on the upstream side of the annular throttle groove 84. As the fluid pressure in the emergency accumulator 9 exceeds the set pressure, the stepped piston 70 is set in a position shown by two-dot chain lines in FIG. 5 by the fluid pressure in the emergency accumulator 9 against the spring force of the spring 75. In this position, mainly the smaller diameter portion 85 faces the inlet path 14. Therefore, the hydraulic fluid flowing through the inlet path 14 from the pump 6 flows through the annular path 86 toward a second annular groove 11 without throttling so as not to develop fluid pressure. In this manner, the spool valve constitutes of the annular throttle groove 84 and the smaller diameter portion 85 in the right end portion of the stepped piston 70.

It should be understood that the fluid pressure in the emergency accumulator 9 is exerted on a step portion 70a of the stepped piston 70 through the path 87, the chamber 80, the space 76, the accumulator path 31, and a path 88.

The other structures of the booster 3 of the second embodiment are the same as that of the booster 3 of the first embodiment shown in FIG. 1. The operation and effects of the booster 3 of the second embodiment besides the operation of the spool valve are the same as that of the booster 3 of the first embodiment.

Figure 6:
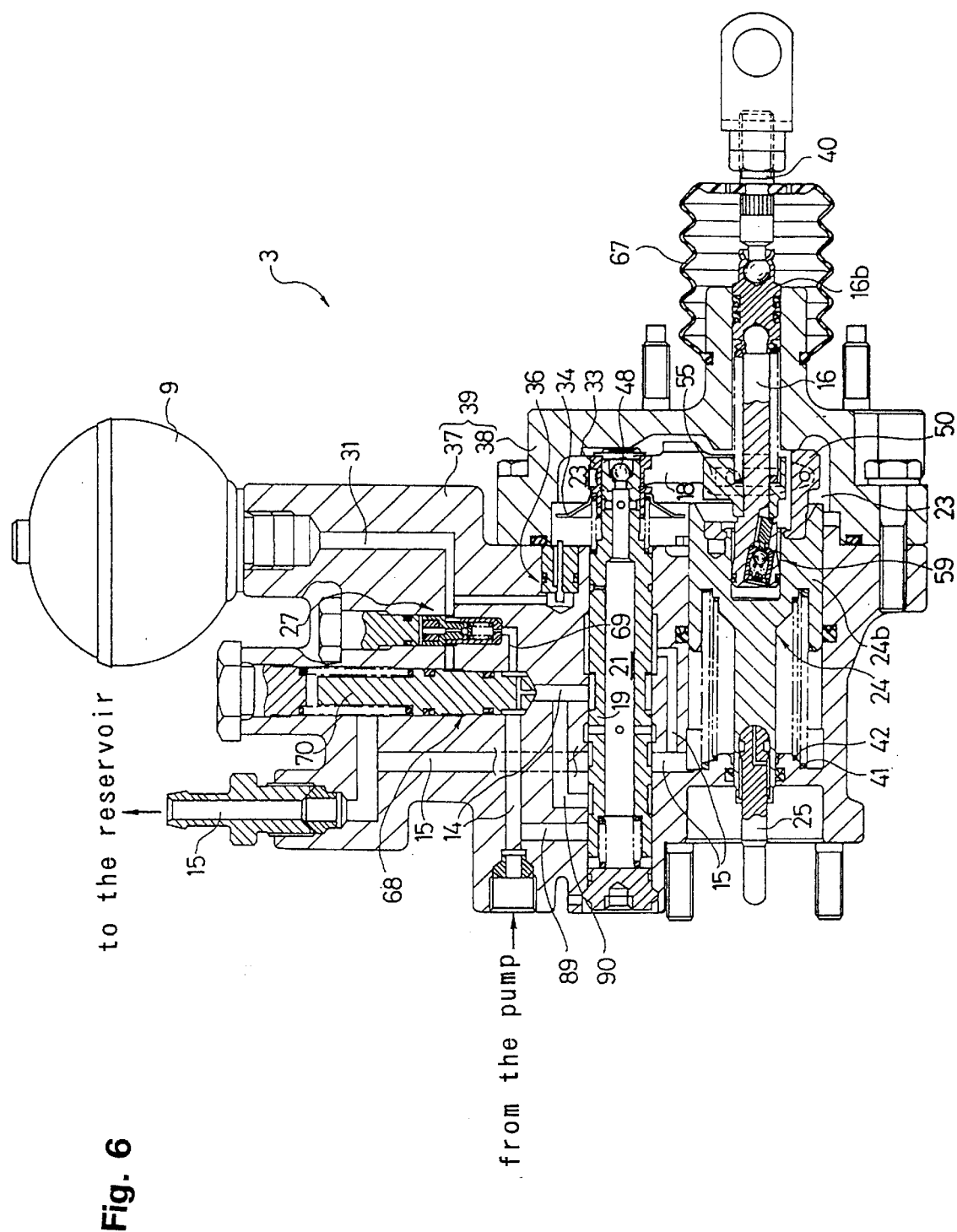
FIG. 6 is a longitudinal sectional view showing a third embodiment of the present invention.

FIG. 6 is a longitudinal sectional view similar to FIG. 1(a) showing a third embodiment of the present invention. It should be noted that parts similar or corresponding to the parts of the aforementioned first embodiment will be marked by the same reference numerals so that the description about the parts will be omitted.

Though, when the braking operation is performed during the flow limiting valve 68 restricts the flow of the hydraulic fluid flowing into the second annular groove 11, some extent boosting operation is ensured by the fluid pressure in the emergency accumulator 9 in both the boosters 3 of the first and second embodiments, the booster 3 of the third embodiment can perform boosting operation similar to the boosting operation during the normal braking operation.

That is, as shown in FIG. 6, a front housing 37 is provided with a first linear bypass 89 opening to an inlet path 14 on the pump 6 side of a flow limiting valve 68 and to a hole 44 of the front housing 37 in which a valve spool 19 is inserted and a second L-like bypass 90 opening to the inlet path 14 on the valve spool side of the flow limiting valve 68 and to the hole 44.

Figure 7:
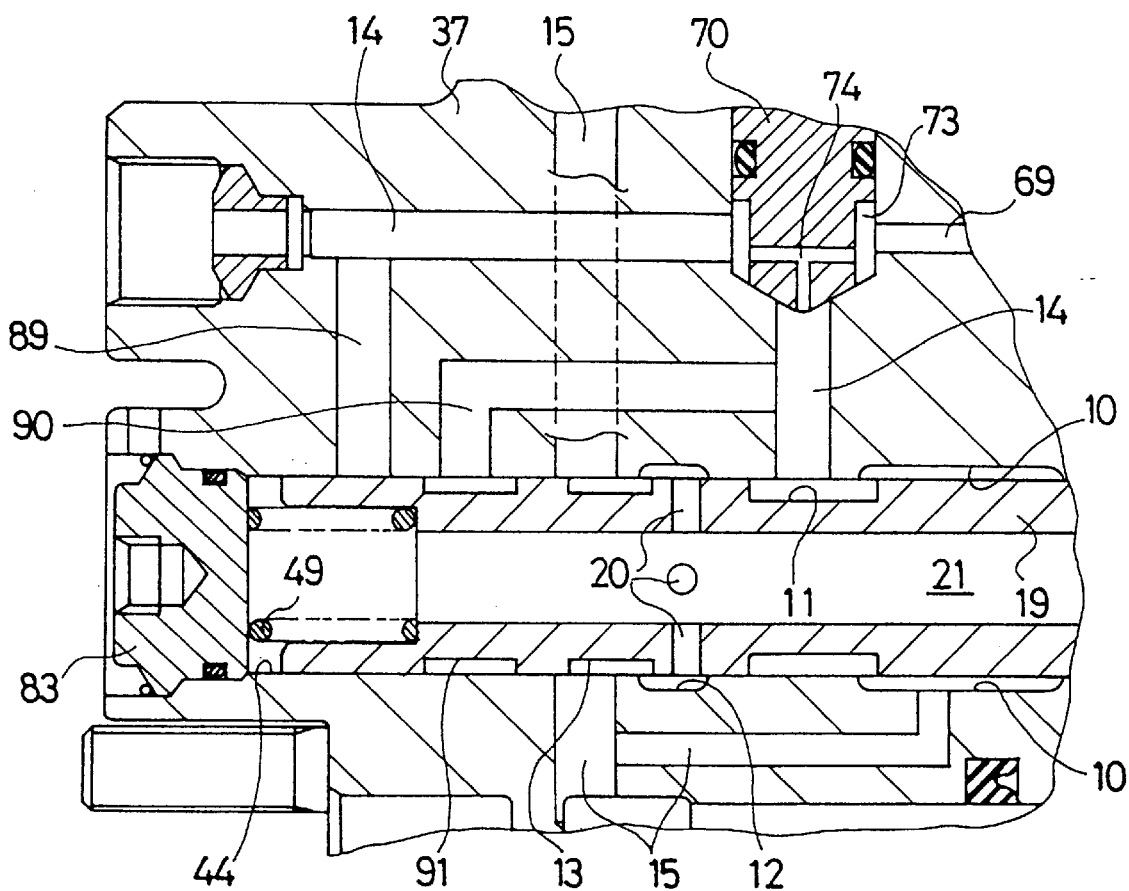
FIG. 7 is an enlarged sectional view of a part of a brake booster of the third embodiment of the present invention.

As shown in FIG. 7 in detail, the valve spool 19 is further provided with a fifth annular groove 91 between the left end side and a fourth annular groove 13 of the valve spool 19. The fifth annular groove 91 always communicates with the second bypass 90. The open end of the first bypass 89 facing the hole 44 is closed by the valve spool 19 when the braking operation is not performed. During normal braking operation, the valve spool 19 moves forward and the communication between the fifth annular groove 91 and the first bypass 89 is thereby allowed so that the first bypass 89 and the second bypass 90 communicate through the fifth annular groove 91. That is, during normal braking operation, a pump 6 directly communicates with the second annular groove 11 of the valve spool 19 through the inlet path 14, the first bypass 89, the fifth annular groove 91, the second bypass 90, and the inlet path 14, bypassing the flow limiting valve 68. The other structures of the booster 3 of the third embodiment are the same as that of the booster 3 of the first embodiment shown in FIG. 1.

In the booster 3 of the third embodiment as structured above, when the normal braking operation is performed during the fluid pressure in the emergency accumulator 9 is less than the set pressure and the flow limiting valve 68 restricts the flow of the hydraulic fluid flowing into the second annular groove 11, the hydraulic fluid discharged from the pump 6 flows into the second annular groove 11 through the inlet path 14, the first bypass 89, the fifth annular groove 91, the second bypass 90, and the inlet path 14 without any restriction and the booster 3 develops the predetermined fluid pressure corresponding to the leg-power exerted on the brake pedal 2 in the same manner as the first embodiment and the second embodiment. Therefore, during the normal braking operation, the booster 3 can perform the boosting operation with the predetermined degree and the normal braking is thus performed with the predetermined degree.

According to the third embodiment, even when the braking operation is performed during the flow limiting valve 68 restricts the flow of the hydraulic fluid flowing into the second annular groove 11, the booster 3 can boost the leg-power exerted on the brake pedal 2 to securely perform the normal braking.

The operation and effects of the booster 3 of the third embodiment are the same as that of the booster 3 of the first embodiment.

FIG. 8 and FIG. 9 are longitudinal sectional views similar to FIG. 1(a) showing a fourth embodiment of the present invention. It should be noted that parts similar or corresponding to the parts of the aforementioned conventional example and the embodiments of the present invention will be marked by the same reference numerals so that the description about the parts will be omitted.

Though the charging valve 28 is integrally built in the housing of the booster 3 in the aforementioned embodiments and the conventional example, a charging valve 28 is not built in a housing of a booster 3 and is disposed separate from the hydraulic booster 3 of the hydraulic boosting device in the fourth embodiment.

Figure 12:
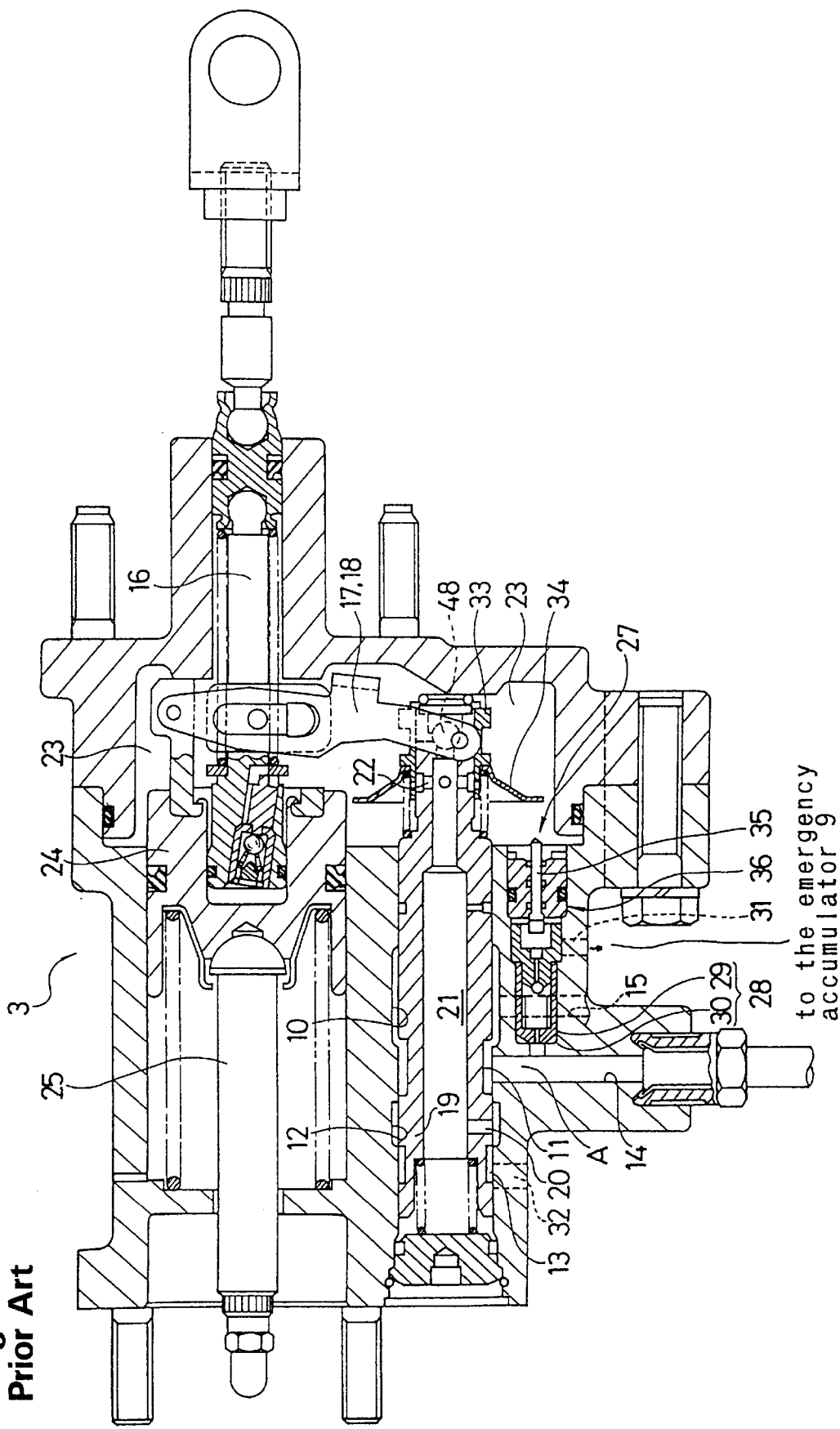
FIG. 12 is a view showing an example of conventional open centre hydraulic brake booster.

In the brake booster 3 of the hydraulic boosting device of the fourth embodiment, as shown in FIG. 8, a valve spool 19 is disposed beneath the power piston 24 in the same manner as the conventional booster shown in FIG. 12. Though the accumulator valve 27 of the conventional booster 3 is provided with the charging valve 28 constituting of the check valve comprising the valve body 29 and the rubber seat 30, the booster 3 of the fourth embodiment is not provided with such a charging valve 28 and is only provided with a relief valve 77 and a dump valve 36 constituting of a check valve. As described later, the hydraulic boosting device of this embodiment is provided with a charging valve device 28 for automatically storing pressure in an emergency accumulator 9 instead of the charging valve 28, the charging valve device 28 being separately disposed apart from the booster 3.

Further, in the booster 3 of the fourth embodiment, a circulating path 15 is also used as the discharge path 32 of the conventional booster of FIG. 12 in the same manner as the boosters of the above embodiments of the present invention. Therefore, the first annular groove 10 always communicates with a reservoir 8 through the circulating path 15 and a piping line 127.

Though the switching valve 65 and the press pin 66 are arranged diagonally toward the lower right in the first embodiment, a switching valve 65 and a press pin 66 of the fourth embodiment are arranged diagonally toward the upper right, with the constitution of those being the same. Moreover, a valve control member 55 has the same constitution as that of the booster 3 of the first embodiment, besides reversed in the vertical direction. The other structures of the booster 3 of the fourth embodiment are the same as that of the conventional booster 3 shown in FIG. 12.

On the other hand, the charging valve device 28 of the hydraulic boosting device of the fourth embodiment has a housing 93 disposed apart from the housing of the booster 3. The emergency accumulator 9 is disposed in the housing 93. The housing 93 is provided with a fluid inlet 95 connected to the discharge side of the pump 6 through a piping line 94. The fluid inlet 95 is connected to a path 96 connected to the inlet path 14 of the booster 3 and to a path 69 communicating with the emergency accumulator 9. Also disposed in the housing 93 is a flow limiting valve 68 arranged between the fluid inlet 95 and the path 96 and between the fluid inlet 95 and the path 69. The flow limiting valve 68 is hermetically and slidably inserted into the housing 93 and is provided with a stepped piston 70 having a step portion 70a.

Formed in a lower end portion of the stepped piston 70 is a first valve portion 98 which can be seated in a valve seat 97 formed in the housing 93. The first valve portion 98 is provided with a T-like throttle path 99 formed therein opening to the path 69 and the lower end of the stepped piston 70. The diameter of the throttle path 99 is set to be significantly smaller than that of the paths 94, 96. The valve seat 97, the first valve portion 98, and the throttle path 99 comprise together a first throttle valve. An annular groove 100 to which the path 96 opens and the step portion 70a of the stepped piston 70 comprise together a second throttle valve.

The stepped piston 70 is always biased by the spring force of the spring 75 in such directions that the first valve portion 98 is seated in the valve seat 97 and the stepped portion is apart from the annular groove 100. The fluid pressure of the path 69 is exerted on the step portion 70a of the stepped piston 70 against the spring force of the spring 75. The housing 93 is provided with a chamber 101 which the upper end of the stepped piston 70 faces. As described latter, the fluid pressure of hydraulic fluid introduced into the chamber 101 is exerted on the stepped piston 70 in the same direction as the spring force of the spring 75.

The chamber 101 can communicate with the emergency accumulator 9 through paths 102, 103 and also can communicate with the reservoir 8 through paths 102, 104, an outlet 105, and a piping line 106. Disposed among the path 102, the path 103, and the path 104 is a pressure control valve 107 which is hermetically and slidably inserted into the housing 93. The pressure control valve 107 comprises a stepped seat member 110 having a first seat 108 at the top thereof and a second seat 109 at the bottom thereof, a first valve ball 111 which can be seated in the first seat 108, a second valve ball 112 which is seated in the second seat 109, a first spring 114 which always biases the first valve ball 111 through a first pressing member 113 in such a direction that the first valve ball 111 seated in the first seat 108, a second spring 116 which always biases the second valve ball 112 through a second pressing member 115 in such a direction that the second valve ball 112 seated in the second seat 109, an adjusting screw 118 which adjusts a set force of the second spring 116 through a retainer 117 in such a manner that the second valve ball 112 is seated in the second seat 109 when the pressure stored in the emergency accumulator 9 is less than the set pressure, and that the second valve ball 112 is parted from the second seat 109 when the pressure stored in the emergency accumulator 9 exceeds the set pressure as described later, a double nut 119 for fixing the adjusting screw 118 to the housing 93, and a stem 120 slidably inserted into the inner hole of the stepped seat member 110 for selectively pressing the first or second valve ball 111, 112 in such a direction that the first or second valve ball 111, 112 is parted from the first or second seat 108, 109.

In the pressure control valve 107, the stepped seat member 110 comes in contact with the plug 121 threaded into the housing 93 by that the stepped seat member 110 is pressed upward through the second valve ball 112 by the spring force of the second spring 116 in the inoperative state as shown. In this state, the second valve ball 112 is seated in the second seat 109 while the first valve ball 111 is pressed by the stem 120 apart from the first seat 108. The pressure control valve 107 is held in this state during the pressure stored in the emergency accumulator 9 is less than the set pressure. As the pressure stored in the emergency accumulator 9 reaches the set pressure, the second valve ball 112 is parted from the second valve seat 109 against the spring force of the second spring 116 and the first valve ball 111 is seated in the first seat 108.

Disposed on the way of the path 69 is a check valve 122 to allow only the flow of hydraulic fluid toward the emergency accumulator 9.

The emergency accumulator 9 communicates with the accumulator path 31 of the booster 3 through a path 123 and a piping line 126. Disposed on the way of the path 123 is an alarm switch 124 consisting of a pressure switch detecting the drop in the pressure of the emergency accumulator 9.

In the hydraulic boosting device of the fourth embodiment as structured above, the flow limiting valve 68 and the pressure control valve 107 are set in the state shown in FIG. 9 when the pump 6 is not driven. That is, the flow limiting valve 68 is set in a first state where the first valve portion 98 is seated in the valve seat 97 and the step portion 70a is apart from the annular groove 100. As the pump 6 is driven by actuating an engine 7 when the flow limiting valve 68 is set in the first state and the pressure in the emergency accumulator 9 is less than the set pressure, the hydraulic fluid discharged from the pump 6 is introduced into the fluid inlet 95 of the charging valve device 28 through the piping line 94. The hydraulic fluid introduced into the fluid inlet 95 flows toward the path 69 through the throttle path 99 of the stepped piston 70 of the flow limiting valve 68. At this point, the hydraulic fluid is throttled so as to develop a relatively low first fluid pressure in the fluid inlet 95. Because of the first fluid pressure, the stepped piston 70 slightly moves upward so that the first valve portion 98 is parted from the valve seat 97, and the step portion 70a of the second throttle valve communicates slightly with the annular groove 100. That is, the flow limiting valve 68 is set in a second state. As a result of this, the hydraulic fluid discharged from the pump 6 passes through a space between the first valve portion 98 and the valve seat 97, is throttled by a communicating space between the step portion 70a of the stepped piston 70 and the annular groove 100 into the path 96, and flows into the inlet path 14 of the booster 3 through the piping line 125. At the same time, a second fluid pressure larger than the first fluid pressure is developed in the path 69 by that the hydraulic fluid flowing into the path 96 is throttled by the second throttle valve consisting of the step portion 70a and the annular groove 100. The second fluid pressure flows into the emergency accumulator 9 through the check valve 122 and is automatically stored in the emergency accumulator 9.

The fluid pressure stored in the emergency accumulator 9 is introduced into the chamber 101 through the path 103, the space between the first valve ball 111 and the first seat 108, and the path 102. Since the fluid pressure introduced into the chamber 101 is exerted downward on the stepped piston 70, the stepped piston 70 is held in a position where upward force produced by that the fluid pressure of the path 69 is exerted upward on the stepped piston 70 and resultant force between downward force produced by that the fluid pressure of the chamber 101 is exerted downward on the stepped piston 70 and the spring force of the spring 75 are balanced. When the stepped piston 70 is in this state, the flow of the hydraulic fluid to the booster 3 through the path 96 is throttled. Therefore, in the condition which the flow of the hydraulic fluid to the booster 3 is throttled, the pressure-storage of the emergency accumulator 9 is continued. In this state, the fluid pressure of the chamber 101 is slightly lower than the fluid pressure of the path 69 only by the force of the spring 75. The stepped seat member 110 moves slightly downward against the force of the spring 116 by the fluid pressure of the path 103 i.e. the fluid pressure in the emergency accumulator 9 and is held in a state that the step portion of the stepped seat member 110 is in contact with the step portion of the housing.

When the normal braking operation is performed during the fluid pressure in the emergency accumulator 9 is less than the set pressure and the pressure-storage of the emergency accumulator 9 is continued, in the same manner as the cases of the above embodiments and the conventional example, the valve spool 19 of the control valve moves forward, the space between the first annular groove 10 and the second annular groove 11 is restricted, a fluid pressure is developed in the second annular groove 11, and the developed fluid pressure is introduced into the power chamber 23 of the booster 3 so as to actuate the booster 3. In this case, the space between the first annular groove 10 and the second annular groove 11 is restricted to be smaller than the space between the step portion 70a of the stepped piston 70 and the annular groove 100 of the flow limiting valve 68 in this case, thereby securely and rapidly developing the fluid pressure in the second annular groove 11 and also securely and rapidly actuating the booster.

As the fluid pressure stored in the emergency accumulator 9 reaches the set pressure, the second valve ball 112 moves downward apart from the second seat 109 against the spring force of the spring 116 by the fluid pressure introduced in the chamber 101. As a result of the downward movement of the second valve ball 112, the stem 120 and the first valve ball 111 also move downward so that the first valve ball 111 is seated in the first seat 108. Therefore, the path 102 is shut off from the path 103 and is allowed to communicate with the path 104 so that the fluid pressure in the emergency accumulator 9 is not introduced into the chamber 101 and the fluid pressure in the chamber 101 is discharged to the reservoir 8 through the path 102, the space between the second valve ball 112 and the second seat 109, the path 104, the outlet 105, and the piping line 106.

As a result, there is substantially no fluid pressure in the chamber 101, i.e. the inside of the chamber 101 is at atmospheric pressure, whereby the stepped piston 70 further moves upward and the space between the step portion 70a and the annular groove 100 is increased. That is, the flow limiting valve 68 is set in a third state and is held in a state that the hydraulic fluid flowing from the path 69 to the path 96 is slightly throttled. That is, the flow rate of the hydraulic fluid to the booster 3 increases and the fluid pressure developed in the path 69 drops so that the pressure-storage of the emergency accumulator 9 is finished. Since there is no fluid pressure in the chamber 101, the force of the first valve ball 111 for sitting in the first seat 108 increases in such a manner that the first valve ball 111 is not parted from the first seat 108 by the spring force of the spring 116.

As the pump 6 is actuated during the fluid pressure stored in the emergency accumulator 9 exceeds the set pressure, the flow limiting valve 68 is set in the third state directly from the first state.

When the pump 6 fails, in the same manner as the case of the above conventional example, the power chamber 23 is shut off from the pump 6 and the reservoir 8, the valve body 35 of the accumulator valve 27 is moved forward by the retainer 34 to open the dump valve 36, the fluid pressure stored in the emergency accumulator 9 is introduced into the power chamber 23 through the path 123, the piping line 126, the accumulator path 31, and the open dump valve 36, and the power piston 24 is actuated by the fluid pressure in the emergency accumulator 9.

As the fluid pressure in the emergency accumulator 9 is spent and thus the pressure stored in the emergency accumulator 9 drops, the second valve ball 112 of the pressure control valve 107 moves upward by the spring force of the spring 116 and is then seated in the second seat 109, while the stem 120 moves upward so that the first valve ball 111 moves upward apart from the first seat 108. Therefore, the fluid pressure in the emergency accumulator 9 is introduced into the chamber 101 again and the stepped piston 70 moves downward again so that the space between the step portion 70a and the annular groove 100 is decreased, with the result that the hydraulic fluid flowing from the path 69 into the path 96 is throttled again to the same as that in the state of the pressure-storage of the emergency accumulator 9. Therefore, the fluid pressure of the path 69 i.e. the discharge pressure of the pump 6 increases so that the pressure-storage of the emergency accumulator 9 is resumed. In addition, the drop in the pressure stored in the emergency accumulator 9 is detected by the alarm switch 124 and is notified to the driver.

According to the fourth embodiment, even when the braking operation is performed during the automatic pressure-storage of the emergency accumulator 9 is performed, the hydraulic boosting device can boosts the leg-power exerted on the brake pedal 2 to the predetermined degree so as to ensure the normal positive braking. In addition, when the pressure stored in the emergency accumulator 9 exceeds the set pressure, the flow rate of hydraulic fluid to the booster 3 is increased by the flow limiting valve 68 so as to further securely perform the normal braking.

When the pump 6 is actuated during the pressure in the emergency accumulator 9 is less than the set pressure, the hydraulic fluid discharged from the pump 6 is throttled by the second throttle valve of the flow limiting valve 68 and then flows into the emergency accumulator 9, thereby diluting the rushing pressure of the emergency accumulator 9. This relieves the impact to the emergency accumulator 9 due to the rushing pressure when the pump 6 is started.

The flow of hydraulic fluid into the emergency accumulator 9 by the flow limiting valve 68 is controlled to correspond to the storage state of the emergency accumulator 9 by the pressure control valve 107. Therefore, when the pressure stored in the emergency accumulator 9 is less than the set pressure, a great quantity of hydraulic fluid is supplied to the emergency accumulator 9 in such a manner that the pressure stored in the emergency accumulator 9 can rapidly reaches the set pressure, thereby improving the precision of storage control to the set pressure.

Moreover, since whether the pressure stored in the emergency accumulator 9 exceeds the set pressure or not is detected by the alarm switch 124, in the case of an abnormal event where the fluid pressure in the emergency accumulator 9 does not reach the set pressure even when the pump 6 is driven because of, for example, malfunction of the charging valve device 28, the abnormal event can be securely detected.

The other operations and effects of the hydraulic boosting device of the fourth embodiment are the same as those of the booster 3 of the first embodiment.

FIG. 10 shows a variation of the fourth embodiment.

Though the booster 3 and the charging valve device 28 formed as individual units are separately arranged and the booster 3 and the charging valve device 28 are in communication by the piping line 125, 126 in the above hydraulic boosting device of the fourth embodiment, the charging valve device 28 is removably fixed integrally with the booster 3 by bolts 128 as shown in FIG. 10 in this variation, thereby reducing the installation space of the booster 3 and the charging valve device 28 and facilitating the contamination control. In addition, the piping is useless, the working of the charging valve device 28 is facilitated, and the inspection for the valve performance is possible.

While the flow limiting valve 68 is disposed on the way of the inlet path 14 in the first and second embodiments, the present invention is not limited thereto and the flow limiting valve 68 can be disposed on the way of the circulating path 15, The present invention can be adapted to a hydraulic boosting device in which an open centre type power steering is disposed on the way of the circulating path 15 downstream of the brake booster. Further, the present invention can be adapted to an open centre type hydraulic boosting device for another apparatus besides the brake booster, for example a clutch boosting device.

As apparent from the above description, in the hydraulic boosting device of the present invention, fluid pressure is automatically developed whenever the fluid pressure in the emergency accumulator is less than the set pressure so that the emergency accumulator can always store the pressure exceeding the set pressure. Therefore, even when no fluid pressure is developed by the operation of the control valve due to the pump failure, the hydraulic boosting device can perform the boosting operation more times than the conventional one, thereby improving the safety of the operation of the hydraulic boosting device.

Since the flow limiting means having the throttle valve an the valve operation control means can be mechanically structured, thereby making the structure of the flow limiting means simple and further ensuring the operation. As a result, the reliability of the hydraulic boosting device is improved and the hydraulic boosting device can be manufactured at low cost.

Also according to the present invention, during normal operation of the hydraulic boosting device, the communication through the bypass is allowed to bypass the flow limiting means by the control valve. Therefore, even when the normal operation is performed during the flow limiting means throttles the flow rate of the hydraulic fluid flowing the control valve, the hydraulic boosting device can boosts the operating force to the same predetermined degree as normal cases so as to ensure the normal positive operation.

Also according to the present invention, when the pump is started during the pressure in the emergency accumulator is less than the set pressure, the hydraulic fluid is throttled by the flow limiting means and then flows into the emergency accumulator, thereby diluting the rushing pressure of the emergency accumulator and relieving the impact to the emergency accumulator due to the rushing pressure when the pump is actuated. Since the flow limiting means is controlled by the first and second fluid pressures and the fluid pressure in the emergency accumulator, the fluid pressure in the emergency accumulator can rapidly reach the set pressure and the precision of storage control to the set pressure is improved.

What we claim is:

1. An open centre type hydraulic boosting device, for boosting operational force and then outputs, comprising:

an input shaft which is actuated by the operational force;

an inlet path in which hydraulic fluid discharged from a pump is supplied;

a circulating path for circulating said hydraulic fluid to a reservoir;

a power chamber in which fluid pressure of said hydraulic fluid is introduced in the operative state;

a power piston which is actuated by the fluid pressure in said power chamber;

a control valve which is controlled by the operation of said input shaft, wherein in the inoperative state, said control valve allows said hydraulic fluid flowing though said inlet path to freely flow into said circulating path and allows the communication between said power chamber and said reservoir, and in the operative state, said control valve at least throttles the flow of said hydraulic fluid flowing through said inlet path to develop a fluid pressure and introduces the fluid pressure into said power chamber;

a flow limiting means having a throttle valve which switches between a first position where the flow of said hydraulic fluid flowing through said inlet path or said circulating path is throttled so as to develop a fluid pressure and a second position where the flow of the said hydraulic fluid is not throttle at all so that said hydraulic fluid flows freely;

an emergency accumulator in which the fluid pressure developed by said flow limiting means is stored; and an emergency valve means which is actuated by said control valve in an emergency to introduce the fluid pressure in said emergency accumulator into said power chamber, wherein said flow limiting means includes a valve operation control means which sets said throttle valve in said first position when the fluid pressure in said emergency accumulator is spent and the fluid pressure in said emergency accumulator becomes less than a set pressure, and sets said throttle valve in said second position when the fluid pressure in said emergency accumulator exceeds said set pressure.

2. A hydraulic boosting device as claimed in claim 1, wherein said valve operation control means is a stepped piston having a step portion on which the fluid pressure in said emergency accumulator is exerted.

3. A hydraulic boosting device as claimed in claim 1, wherein said throttle valve comprises a conical valve in which a throttle path is formed and a valve seat in which said conical valve is seated, and wherein said valve operation control means sets said throttle valve in said first position by controlling said conical valve to be seated in said valve seat when the fluid pressure in said emergency accumulator is less than said set pressure, whereby said hydraulic fluid flowing through said inlet path or said circulating path flows through said throttle valve so as to develop a fluid pressure, and sets said throttle valve in said second position by controlling said conical valve to be apart from said valve seat when the fluid pressure in said emergency accumulator exceeds said set pressure, whereby said hydraulic fluid flowing through said inlet path or said circulating path flows freely through a space between said conical valve and said valve seat so that said hydraulic fluid is not throttle.

4. A hydraulic boosting device as claimed in claim 1, wherein said throttle valve comprises a spool valve, said spool valve having an annular throttle groove and an annular path portion forming an annular path having a relative large section, wherein said valve operation control means sets said throttle valve in said first position by controlling said spool valve in such a manner that said annular throttle groove is positioned to face said inlet path or said circulating path when the fluid pressure in said emergency accumulator is less than said set pressure, whereby said hydraulic fluid flowing through said inlet path or said circulating path flows through said annular throttle groove so as to develop a fluid pressure, and sets said throttle valve in said second position by controlling said spool valve in such a manner that said annular path portion is positioned to face said inlet path or said circulating path when the fluid pressure in said emergency accumulator exceeds said set pressure, whereby said hydraulic fluid flowing through said inlet path or said circulating path flows freely through said annular path so that said hydraulic fluid is not throttle.

5. An open centre type hydraulic boosting device, for boosting operational force and then outputs, comprising:

an input shaft which is actuated by the operational force;

an inlet path in which hydraulic fluid discharged from a pump is supplied;

a circulating path for circulating said hydraulic fluid to a reservoir;

a power chamber in which fluid pressure of said hydraulic fluid is introduced in the operative state;

a power piston which is actuated by the fluid pressure in said power chamber;

a control valve which is controlled by the operation of said input shaft, wherein in the inoperative state, said control valve allows said hydraulic fluid flowing though said inlet path to freely flow into said circulating path and allows the communication between said power chamber and said reservoir, and in the operative state, said control valve at least restricts the flow of said hydraulic fluid flowing through said inlet path to develop a fluid pressure and introduces the fluid pressure into said power chamber;

a flow limiting means having a throttle valve which switches between a first position where the flow of said hydraulic fluid flowing through said inlet path is throttled so as to develop a fluid pressure and a second position where the flow of the said hydraulic fluid is not throttle at all so that said hydraulic fluid flows freely;

an emergency accumulator in which the fluid pressure developed by said flow limiting means is stored; and an emergency valve means which is actuated by said control valve in an emergency to introduce the fluid pressure in said emergency accumulator into said power chamber, wherein said flow limiting means includes a valve operation control means which sets said throttle valve in said first position when the fluid pressure in said emergency accumulator is spent and the fluid pressure in said emergency accumulator becomes less than a set pressure, and sets said throttle valve in said second position when the fluid pressure in said emergency accumulator exceeds said set pressure, and wherein said hydraulic boosting device further comprises a bypass for allowing the hydraulic fluid discharged from said pump to flow into said control valve bypassing said flow limiting means, said bypass is shut off by said control valve in the inoperative state and is allowed to communicate in the operative state.

6. An open centre type hydraulic boosting device, for boosting operational force and then outputs, comprising:

an input shaft which is actuated by the operational force;

an inlet path in which hydraulic fluid discharged from a pump is supplied;

a circulating path for circulating said hydraulic fluid to a reservoir;

a power chamber in which fluid pressure of said hydraulic fluid is introduced in the operative state;

a power piston which is actuated by the fluid pressure in said power chamber;

a control valve which is controlled by the operation of said input shaft, wherein in the inoperative state, said control valve allows said hydraulic fluid flowing though said inlet path to freely flow into said circulating path and allows the communication between said power chamber and said reservoir, and in the operative state, said control valve at least restricts the flow of said hydraulic fluid flowing through said inlet path to develop a fluid pressure and introduces the fluid pressure into said power chamber;

an emergency accumulator in which an emergency fluid pressure is stored for operating said power piston in an emergency such as in a case of said pump failure;

a flow limiting means in which a first state, a second state and a third state are set, wherein said flow limiting means set in the first state throttles a path allowing the communication between said pump and said emergency accumulator by a first throttle valve and interrupts the communication between said pump and said inlet path when said pump is not driven and throttles the hydraulic fluid discharged from said pump by said first throttle valve to develop a first fluid pressure when said pump is started, said flow limiting means set in the second state is operated with said first fluid pressure to throttle and allow the communication between said pump and said inlet path by a second throttle valve, to little throttle the path allowing the communication between said pump and said emergency accumulator, and to throttle the hydraulic fluid discharged from said pump to supply said hydraulic fluid into said inlet path and develop a second fluid pressure greater than said first fluid pressure to supply the second fluid pressure into said emergency accumulator when the pressure in the emergency accumulator is less than a set pressure, and said flow limiting means set in a third state little throttles the communication between said pump and said inlet path when the pressure in the emergency accumulator exceeds the set pressure; and an emergency valve means which is actuated by the operation of said control valve in an emergency to introduce the fluid pressure in said emergency produced by the flow limiting means into said power chamber.

7. A hydraulic boosting device as claimed in claim 6, wherein said flow limiting means comprises a stepped piston slidably disposed in a housing, said first fluid pressure and said second fluid pressure being exerted on said stepped piston and the fluid pressure in said emergency accumulator being exerted on said stepped piston in a direction opposite to the direction in which said first fluid pressure and said second fluid pressure are exerted;

said first throttle valve comprises a valve body having a throttle path formed in said stepped piston and a valve seat, said valve body being seated in said valve seat in said first state and being parted from said valve seat in said second and third states;

said second throttle valve comprises a step portion formed in said stepped piston and an annular groove formed in said housing and communicating with said inlet path, said step portion and annular groove being shut off each other in said first state, slightly communicating with each other in said second state, and largely communicating with each other in said third state, said stepped piston is selectively set in said first, second, or third state according to the said first fluid pressure, said second fluid pressure, and said fluid pressure in said emergency accumulator.

8. A hydraulic boosting device as claimed in claim 7, further comprising a pressure control valve for controlling in such a manner said fluid pressure of said accumulator is exerted on said stepped piston when said pressure stored in said emergency accumulator is less than said set pressure and said fluid pressure of said accumulator is not exerted on said stepped piston when said pressure stored in said emergency accumulator exceeds said set.

* * * * *